US010178453B2

United States Patent
Cai et al.

(10) Patent No.: US 10,178,453 B2
(45) Date of Patent: Jan. 8, 2019

(54) ETHERNET FABRIC PROTECTION IN A DISAGGREGATED OTN SWITCHING SYSTEM

(71) Applicant: FUJITSU LIMITED, Kawasaki-Shi, Kanagawa OT (JP)

(72) Inventors: Biaodong Cai, San Ramon, CA (US); Richard Dunsmore, McKinney, TX (US); Rod Naphan, McKinney, TX (US); Sam Lisle, Fairview, TX (US); Deepak Patel, Moorpark, CA (US); Iqbal Syed, Plano, TX (US)

(73) Assignee: FUJITSU LIMITED, Kawasaki (JP)

( * ) Notice: Subject to any disclaimer, the term of this patent is extended or adjusted under 35 U.S.C. 154(b) by 11 days.

(21) Appl. No.: 15/419,649

(22) Filed: Jan. 30, 2017

(65) Prior Publication Data

US 2017/0310538 A1   Oct. 26, 2017

Related U.S. Application Data

(60) Provisional application No. 62/325,723, filed on Apr. 21, 2016.

(51) Int. Cl.
*H04L 12/58* (2006.01)
*H04Q 11/00* (2006.01)
(Continued)

(52) U.S. Cl.
CPC ....... *H04Q 11/0062* (2013.01); *H04B 10/032* (2013.01); *H04J 3/1652* (2013.01);
(Continued)

(58) Field of Classification Search
USPC .................................................. 370/252, 393
See application file for complete search history.

(56) References Cited

U.S. PATENT DOCUMENTS

| 2005/0123294 A1 | 6/2005 | Mascolo et al. |
| 2008/0089693 A1 | 4/2008 | El-Ahmadi et al. |

(Continued)

FOREIGN PATENT DOCUMENTS

| EP | 2916496 | 9/2015 |
| EP | 2958279 | 12/2015 |
| EP | 3236601 | 10/2017 |

OTHER PUBLICATIONS

Knudsen-Baas, Per Harald. "OTN switching." Norwegian University of Science and Technology; 140 pages, 2011.
(Continued)

*Primary Examiner* — Zewdu A Beyen
(74) *Attorney, Agent, or Firm* — Baker Botts L.L.P.

(57) ABSTRACT

Methods and systems for Ethernet fabric protection in a disaggregated OTN switching system that include PIU modules each having multiple ports for OTN to Ethernet transceiving and an Ethernet fabric as a switching core are disclosed. An OTN over Ethernet module in each of the PIU modules may enable various OTN functionality to be realized using the Ethernet fabric which may include multiple Ethernet switches. A first PIU module may detect a fault condition on an Ethernet fabric plane of the Ethernet fabric. In response to the detection, the OTN switching system may transmit the fault condition to other PIU modules to redirect optical data unit traffic away from the fault on the Ethernet fabric plane.

20 Claims, 16 Drawing Sheets

(51) Int. Cl.
| | |
|---|---|
| H04L 12/741 | (2013.01) |
| H04L 12/931 | (2013.01) |
| H04J 3/16 | (2006.01) |
| H04L 29/12 | (2006.01) |
| H04L 12/24 | (2006.01) |
| H04B 10/032 | (2013.01) |
| H04L 12/40 | (2006.01) |
| H04L 12/413 | (2006.01) |

(52) U.S. Cl.
CPC ............ *H04L 12/40* (2013.01); *H04L 12/413* (2013.01); *H04L 41/0659* (2013.01); *H04L 41/0677* (2013.01); *H04L 45/745* (2013.01); *H04L 49/351* (2013.01); *H04L 49/70* (2013.01); *H04L 61/2038* (2013.01); *H04L 61/6022* (2013.01); *H04Q 11/0005* (2013.01); *H04J 2203/0012* (2013.01); *H04J 2203/0026* (2013.01); *H04J 2203/0085* (2013.01); *H04Q 11/0066* (2013.01); *H04Q 2011/0073* (2013.01)

(56) References Cited

U.S. PATENT DOCUMENTS

| | | |
|---|---|---|
| 2009/0109843 A1 | 4/2009 | Yang |
| 2009/0317073 A1 | 12/2009 | Hotchkiss et al. |
| 2011/0255552 A1 | 10/2011 | Ellegard |
| 2011/0280567 A1* | 11/2011 | Lyon .................. H04B 10/0791 398/10 |
| 2012/0063312 A1 | 3/2012 | Sarwar et al. |
| 2013/0136446 A1 | 5/2013 | Hotshkiss et al. |
| 2013/0163982 A1 | 6/2013 | Tochio |
| 2013/0343747 A1 | 12/2013 | Sarwar et al. |
| 2014/0193146 A1 | 7/2014 | Lanzone et al. |
| 2015/0023368 A1 | 1/2015 | Connolly et al. |
| 2016/0226578 A1 | 8/2016 | Yuan et al. |

OTHER PUBLICATIONS

Wikipedia, "Small form-factor pluggable transceiver." https://en.wikipedia.org/wiki/Small_form-factor_pluggable_transceiver; 7 pages, 2016.

Rajesh K, "Data Center Network—Top of Rack (TOR) vs End of Row (EOR) Design." http://www.excitingip.com/2802/data-center-network-top-of-rack-tor-vs-end-of-row-eor-design/; 10 pages, 2016.

Wikipedia, "QSFP." https://en.wikipedia.org/wiki/QSFP; 2 pages, 2016.

Lipscomb, F. "What Is a CFP2-ACO?" https://www.neophotonics.com/what-is-a-cfp2-aco/; 9 pages. 2016.

Hollingsworth, T. "White-Box Switches: Are you Ready?" http://www.networkcomputing.com/networking/white-box-switches-are-you-ready/1465296666; 21 pages, 2014.

Hardy, S. "Fujitsu offers CFP2-ACO coherent optical transceiver." http://www.lightwaveonline.com/articles/2015/03/fujitsu-offers-cfp2-aco-coherent-optical-transceiver.html; 2 pages, 2015.

Fujitsu Limited, "Fujitsu Significantly Expands Its 1FINITY Series of Optical Transmission System Equipment." http://www.fujitsu.com/global/about/resources/news/press- releases/2016/0323-01.html; 5 pages, 2016.

Wikipedia, "C Form-factor Pluggable." https://en.wikipedia.org/wiki/C_Form-factor_Pluggable; 3 pages, 2016.

Extended European Search Report for European Patent Application No. 17167550.7, dated Sep. 20, 2017; 9 pages.

Office Action received from U.S. Appl. No. 15/419,751, dated Jun. 29, 2018; 17 pages.

Office Action received from U.S. Appl. No. 15/419,569, dated Apr. 11, 2018; 7 pages.

Wikipedia, "Optical Carrier Transmission Rates." https://en.wikipedia.org/wiki/Optical_Carrier_transmission_rates, 2017; 4 pages.

Wikipedia, "VT1.5." https://en.wikipedia.org/wiki/VT1.5, 2017; 1 page.

Wikipedia, "Optical Transport Network." https://en.wikipedia.org/wiki/Optical_Transport_Network, 2016; 4 pages.

Wikipedia, "Synchronous Optical Networking." https://en.wikipedia.org/wiki/Synchronous_optical_networking, 2017; 17 pages.

International Telecommunication Union, "Interfaces for the Optical Transport Network" ITU-T G.709/Y.1331 (Jun. 2016); 244 pages.

International Telecommunication Union, "Architecture of Optical Transport Networks" ITU-T G.872 (Jan. 2017); 68 pages.

Wikipedia, "Digital Signal 1" https://en.wikipedia.org/wiki/Digital_Signal_1, 2017; 6 pages.

Extended European Search Report for European Patent Application No. 17167552.3, dated Sep. 21, 2017; 5 pages.

Office Action received from U.S. Appl. No. 15/419,751, dated Oct. 19, 2017; 24 pages.

* cited by examiner

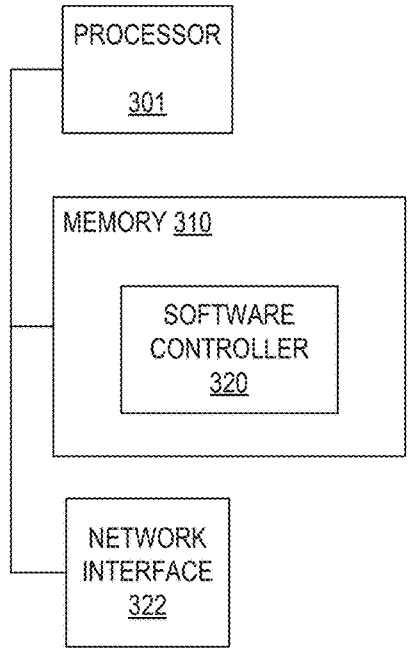
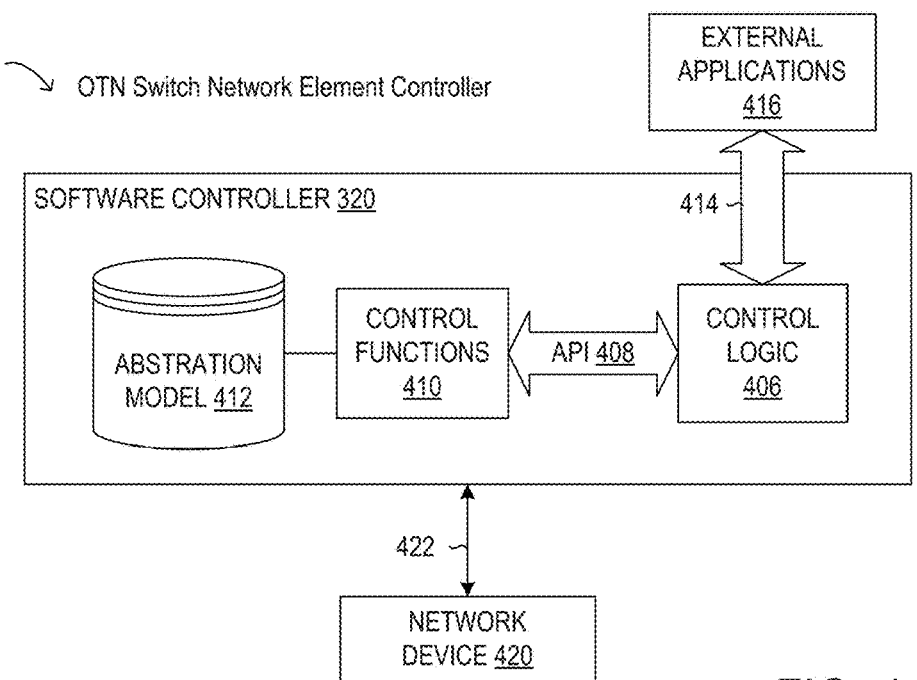

ETHERNET FABRIC PROTECTION IN A DISAGGREGATED OTN SWITCHING SYSTEM

CROSS-REFERENCE TO RELATED APPLICATIONS

This application claims priority from U.S. Provisional Application No. 62/325,723 filed Apr. 21, 2016, entitled "DISAGGREGATED OPTICAL TRANSPORT NETWORK SWITCHING SYSTEM".

BACKGROUND

Field of the Disclosure

The present disclosure relates generally to optical communication networks and, more particularly, to Ethernet fabric protection in a disaggregated optical transport network switching system.

Description of the Related Art

Telecommunication, cable television and data communication systems use optical transport networks (OTN) to rapidly convey large amounts of information between remote points. In an OTN, information is conveyed in the form of optical signals through optical fibers, where multiple sub-channels may be carried within an optical signal. OTNs may also include various network elements, such as amplifiers, dispersion compensators, multiplexer/demultiplexer filters, wavelength selective switches, optical switches, couplers, etc. configured to perform various operations within the network.

In particular, OTNs may be reconfigured to transmit different individual channels using, for example, optical add-drop multiplexers (OADMs). In this manner, individual channels (e.g., wavelengths) may be added or dropped at various points along an optical network, enabling a variety of network configurations and topologies.

Furthermore, typically, an optical transport network (OTN) switch is used to centrally perform electrical switching of the sub-channels carried within an optical signal to different destinations.

SUMMARY

Methods and systems for Ethernet fabric protection in a disaggregated optical transport network (OTN) switching system that include using plug-in universal (PIU) modules each having multiple ports for OTN to Ethernet transceiving and an Ethernet fabric as a switching core are disclosed. An OTN over Ethernet module in each of the PIU modules may enable various OTN functionality to be realized using the Ethernet fabric which may include multiple Ethernet switches. A first PIU module may detect a fault condition on an Ethernet fabric plane of the Ethernet fabric. In response to the detection, the OTN switching system may transmit the fault condition to other PIU modules to redirect optical data unit (ODU) traffic away from the fault on the Ethernet fabric plane.

In one aspect, a disclosed method for Ethernet fabric protection in an OTN switching system may include, in an OTN switch that may include an Ethernet fabric having a number M of Ethernet fabric planes, each of the M Ethernet fabric planes may include a corresponding Ethernet switch of M Ethernet switches. The OTN switch may also include a plurality of PIU modules each having M PIU ports including a first PIU module, where an ith PIU port of each of the plurality of PIU modules may be connected to the ith Ethernet switch of the ith Ethernet fabric plane of the Ethernet fabric. The method may also include assigning a variable i having a value ranging from 1 to M to denote the ith Ethernet fabric plane of the M Ethernet fabric planes, the ith Ethernet switch of the M Ethernet switches, and the ith PIU port of the M PIU ports, where M is greater than one. The method may further include detecting, by the first PIU module, a fault condition associated with the ith PIU port of the first PIU module on the ith Ethernet fabric plane. The method may also include transmitting the fault condition to stop transmission of ODU traffic from the plurality of PIU modules to the ith PIU port of the first PIU module.

In any of the disclosed embodiments of the method, the method may also include after transmitting the fault condition to stop the transmission of the ODU traffic from the plurality of PIU modules to the ith PIU port of the first PIU module, stopping the transmission of the ODU traffic from the plurality of PIU modules to the ith PIU port of the first PIU module.

In any of the disclosed embodiments of the method, the method may further include detecting, by a second PIU module of the plurality of PIU modules, a second fault condition associated with the ith PIU port of the second PIU module on the ith Ethernet fabric plane. The method may also include transmitting the second fault condition to stop the transmission of the ODU traffic from the plurality of PIU modules to the ith PIU port of the second PIU module.

In any of the disclosed embodiments of the method, where transmitting the fault condition and transmitting the second fault condition may be transmitted in the same transmission.

In any of the disclosed embodiments of the method, the method may also include after receiving the fault condition and a second fault condition associated with the ith PIU port of a second PIU module of the plurality of PIU modules on the ith Ethernet fabric plane to stop the transmission of the ODU traffic from the plurality of PIU modules to the ith PIU port of the second PIU module, stopping the transmission of the ODU traffic from the plurality of PIU modules to the ith PIU port of the first PIU module and the ith PIU port of the second PIU module.

In any of the disclosed embodiments of the method, the method may further include prior to transmitting the fault condition to stop the transmission of the ODU traffic from the plurality of PIU modules to the ith PIU port of the first PIU module and transmitting a second fault condition associated with the ith PIU port of a second PIU module of the plurality of PIU modules on the ith Ethernet fabric plane to stop the transmission of the ODU traffic from the plurality of PIU modules to the ith PIU port of the second PIU module, stopping the transmission of the ODU traffic from the M PIU ports of the first PIU module and the M PIU ports of the second PIU module. The method may also include after expiration of a delay associated with the first PIU module and the second PIU module, transmitting the second fault condition to stop the transmission of the ODU traffic from the plurality of PIU modules to the ith PIU port of the second PIU module.

In any of the disclosed embodiments of the method, the method may further include after expiration of a second delay associated with the first PIU module and the second PIU module, transmitting the ODU traffic from the M PIU ports of the first PIU module other than the ith PIU port of the first PIU module and transmitting the ODU traffic from the M PIU ports of the second PIU module other than the ith PIU port of the second PIU module, where the expiration of the second delay is after the expiration of the delay.

In any of the disclosed embodiments of the method, the method may further include receiving a third fault condition associated with the jth PIU port of a third PIU module on the ith Ethernet fabric plane to stop the transmission of the ODU traffic from the plurality of PIU modules to the jth PIU port of the third PIU module. The method may also include after expiration of a second delay associated with the first PIU module and the second PIU module, transmitting the ODU traffic from the M PIU ports of the first PIU module, other than the ith PIU port of the first PIU module to the plurality of PIU modules other than the ith PIU port of the first PIU module, the ith PIU port of the second PIU module, and the jth PIU port of the third PIU module. The method may also include after expiration of the second delay, transmitting the ODU traffic from the M PIU ports of the second PIU module, other than the ith PIU port of the second PIU module, to the plurality of PIU modules other than the ith PIU port of the first PIU module, the ith PIU port of the second PIU module, and the jth PIU port of the third PIU module, where the expiration of the second delay is after the expiration of the delay.

In any of the disclosed embodiments of the method, the method may further include prior to transmitting the fault condition to stop the transmission of the ODU traffic from the plurality of PIU modules to the ith PIU port of the first PIU module and transmitting a second fault condition associated with the ith PIU port of a second PIU module of the plurality of PIU modules on the ith Ethernet fabric plane to stop the transmission of the ODU traffic from the plurality of PIU modules to the ith PIU port of the second PIU module, stopping the transmission of the ODU traffic from the M PIU ports of the first PIU module and the M PIU ports of the second PIU module. The method may also include receiving a third fault condition associated with the jth PIU port of a third PIU module on the ith Ethernet fabric plane to stop the transmission of the ODU traffic from the plurality of PIU modules to the jth PIU port of the third PIU module. The method may further include after expiration of a second delay associated with the first PIU module and the second PIU module, transmitting the second fault condition to stop the transmission of the ODU traffic from the plurality of PIU modules to the ith PIU port of the second PIU module. The method may further include after expiration of the second delay, transmitting the third fault condition to stop the transmission of the ODU traffic from the plurality of PIU modules to the jth PIU port of the third PIU module.

In any of the disclosed embodiments of the method, the method may further include after expiration of a third delay associated with the first PIU module and the second PIU module, transmitting the ODU traffic from the M PIU ports of the first PIU module, other than the ith PIU port of the first PIU module. The method may also include after expiration of the third delay, transmitting the ODU traffic from the M PIU ports of the second PIU module, other than the ith PIU port of the second PIU module, to the plurality of PIU modules other than the ith PIU port of the first PIU module, the ith PIU port of the second PIU module, and the jth PIU port of the third PIU module, where the expiration of the third delay is after the expiration of the second delay.

In any of the disclosed embodiments of the method, the method may further include after receiving the fault condition and a second fault condition associated with the ith PIU port of a second PIU module of the plurality of PIU modules on the ith Ethernet fabric plane to stop the transmission of the ODU traffic from the plurality of PIU modules to the ith PIU port of the second PIU module, stopping the transmission of the ODU traffic from the M PIU ports of a third PIU module of the plurality of PIU modules. The method may also include after expiration of a delay associated with the third PIU module, transmitting the ODU traffic from the M PIU ports of the third PIU module to the plurality of PIU modules other than the ith PIU port of the first PIU module and the ith PIU port of the second PIU module.

In any of the disclosed embodiments of the method, the method may further include detecting a second fault condition of the ith Ethernet fabric plane. The method may also include transmitting the ODU traffic from the plurality of PIU modules to the other Ethernet fabric planes.

In another aspect, a disclosed OTN switching system for Ethernet fabric protection may include an OTN switch including an Ethernet fabric having a number M of Ethernet fabric planes, each of the M Ethernet fabric planes include a corresponding Ethernet switch of M Ethernet switches. The OTN switch may also include a plurality of PIU modules each having M PIU ports including a first PIU module, where an ith PIU port of each of the plurality of PIU modules is connected to the ith Ethernet switch of the ith Ethernet fabric plane of the Ethernet fabric, and where a variable i having a value ranging from 1 to M to denote the ith Ethernet fabric plane of the M Ethernet fabric planes, the ith Ethernet switch of the M Ethernet switches, and the ith PIU port of the M PIU ports, where M is greater than one. The first PIU module may detect a fault condition associated with the ith PIU port of the first PIU module on the ith Ethernet fabric plane. The OTN switch may transmit the fault condition to stop transmission of ODU traffic from the plurality of PIU modules to the ith PIU port of the first PIU module.

In any of the disclosed embodiments of the OTN switching system, the OTN switching system may further include a second PIU module of the plurality of PIU modules that may detect a second fault condition associated with the ith PIU port of the second PIU module on the ith Ethernet fabric plane. The OTN switch may transmit the second fault condition to stop the transmission of the ODU traffic from the plurality of PIU modules to the ith PIU port of the second PIU module.

In any of the disclosed embodiments of the OTN switching system, the OTN switching system may further include the OTN switch, after receiving the fault condition and a second fault condition associated with the ith PIU port of a second PIU module of the plurality of PIU modules on the ith Ethernet fabric plane, may stop the transmission of the ODU traffic from the plurality of PIU modules to the ith PIU port of the second PIU module. The OTN switch may also, after receiving the fault condition and the second fault condition, stop the transmission of the ODU traffic from the plurality of PIU modules to the ith PIU port of the first PIU module and the ith PIU port of the second PIU module.

In any of the disclosed embodiments of the OTN switching system, the OTN switching system may further include the OTN switch, prior to the transmission of the fault condition to stop the transmission of the ODU traffic from the plurality of PIU modules to the ith PIU port of the first PIU module and the transmission of a second fault condition associated with the ith PIU port of a second PIU module of the plurality of PIU modules on the ith Ethernet fabric plane, may stop the transmission of the ODU traffic from the plurality of PIU modules to the ith PIU port of the second PIU module. The OTN switch, prior to the transmission of the fault condition and the transmission of the second fault condition, may stop the transmission of the ODU traffic from the M PIU ports of the first PIU module and the M PIU ports of the second PIU module. The OTN switch, after expiration of a delay associated with the first PIU module and the second PIU module, may transmit the second fault condition to stop the transmission of the ODU traffic from the plurality of PIU modules to the ith PIU port of the second PIU module.

In any of the disclosed embodiments of the OTN switching system, the OTN switching system may further include the OTN switch, after expiration of a second delay associated with the first PIU module and the second PIU module, may transmit the ODU traffic from the M PIU ports of the first PIU module other than the ith PIU port of the first PIU module. The OTN switch, after expiration of the second delay, may transmit the ODU traffic from the M PIU ports of the second PIU module other than the ith PIU port of the second PIU module, where the expiration of the second delay is after the expiration of the delay.

In any of the disclosed embodiments of the OTN switching system, the OTN switching system may further include a third PIU module of the plurality of PIU modules. The OTN switch, prior to the transmission of the fault condition to stop the transmission of the ODU traffic from the plurality of PIU modules to the ith PIU port of the first PIU module and the transmission of a second fault condition associated with the ith PIU port of a second PIU module of the plurality of PIU modules on the ith Ethernet fabric plane to stop the transmission of the ODU traffic from the plurality of PIU modules to the ith PIU port of the second PIU module, may stop the transmission of the ODU traffic from the M PIU ports of the first PIU module and the M PIU ports of the second PIU module. The OTN switch may also receive a third fault condition associated with the jth PIU port of the third PIU module on the ith Ethernet fabric plane to stop the transmission of the ODU traffic from the plurality of PIU modules to the jth PIU port of the third PIU module. The OTN switch, after expiration of a second delay associated with the first PIU module and the second PIU module, may transmit the second fault condition to stop the transmission of the ODU traffic from the plurality of PIU modules to the ith PIU port of the second PIU module. The OTN switch, after expiration of the second delay, may also transmit the third fault condition to stop the transmission of the ODU traffic from the plurality of PIU modules to the jth PIU port of the third PIU module.

In any of the disclosed embodiments of the OTN switching system, the OTN switching system may further include the OTN switch, after expiration of a third delay associated with the first PIU module and the second PIU module, may transmit the ODU traffic from the M PIU ports of the first PIU module, other than the ith PIU port of the first PIU module. The OTN switch, after expiration of the third delay, may transmit the ODU traffic from the M PIU ports of the second PIU module, other than the ith PIU port of the second PIU module, to the plurality of PIU modules other than the ith PIU port of the first PIU module, the ith PIU port of the second PIU module, and the jth PIU port of the third PIU module, where the expiration of the third delay is after the expiration of the second delay.

In any of the disclosed embodiments of the OTN switching system, the OTN switching system may further include a second PIU module of the plurality of PIU modules. The OTN switching system may also include a third PIU module of the plurality of PIU modules, after receiving the fault condition and a second fault condition associated with the ith PIU port of the second PIU module on the ith Ethernet fabric plane, may stop the transmission of the ODU traffic from the plurality of PIU modules to the ith PIU port of the second PIU module. The third PIU module, after receiving the fault condition and the second fault condition, may also stop the transmission of the ODU traffic from the M PIU ports of the third PIU module. The third PIU module, after expiration of a delay associated with the third PIU module, may also transmit the ODU traffic from the M PIU ports of the third PIU module to the plurality of PIU modules other than the ith PIU port of the first PIU module and the ith PIU port of the second PIU module.

BRIEF DESCRIPTION OF THE DRAWINGS

For a more complete understanding of the present invention and its features and advantages, reference is now made to the following description, taken in conjunction with the accompanying drawings, in which:

FIGS. 3 and 4 are block diagrams of selected elements of an embodiment of an OTN switch network element controller;

DESCRIPTION OF PARTICULAR EMBODIMENT(S)

Figure 1:
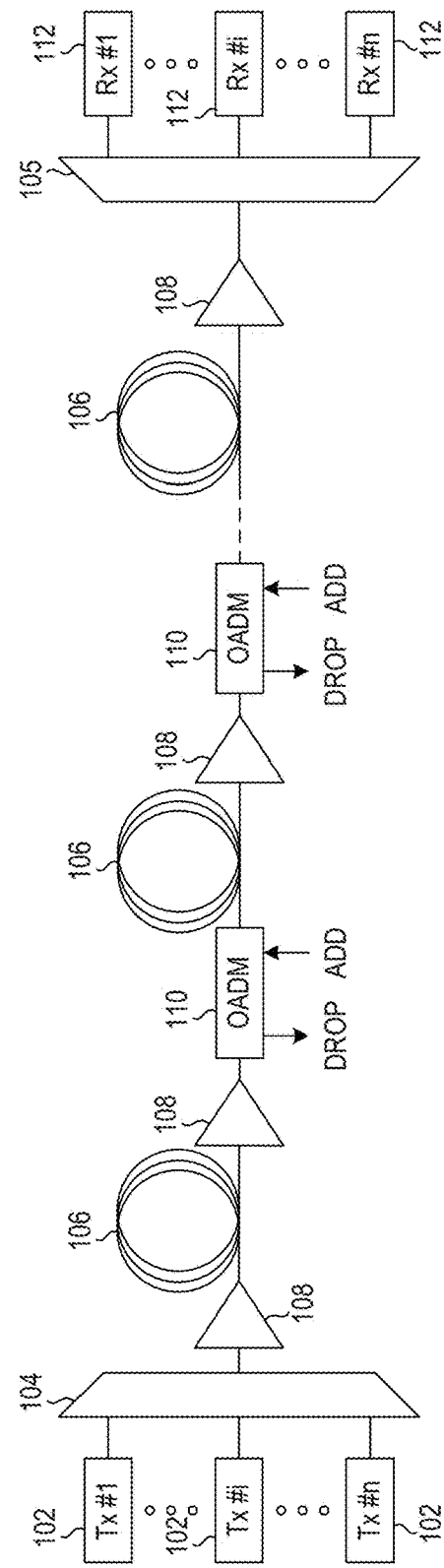
FIG. 1 is a block diagram of selected elements of an embodiment of an optical transport network (OTN)

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), device "12-1" refers to an instance of a device class, which may be referred to collectively as devices "12" and any one of which may be referred to generically as a device "12". In the figures and the description, like numerals are intended to represent like elements.

Turning now to the drawings, FIG. 1 illustrates an example embodiment of an optical transport network 101, which may represent an optical communication system. Optical transport network 101 may include one or more optical fibers 106 configured to transport one or more optical signals communicated by components of optical transport network 101. The network elements of optical transport network 101, coupled together by fibers 106, may comprise one or more transmitters 102, one or more multiplexers (MUX) 104, one or more optical amplifiers 108, one or more optical add/drop multiplexers (OADM) 110, one or more demultiplexers (DEMUX) 105, and one or more receivers 112.

Optical transport network 101 may comprise a point-to-point optical network with terminal nodes, a ring optical network, a mesh optical network, or any other suitable optical network or combination of optical networks. Optical fibers 106 comprise thin strands of glass capable of communicating the signals over long distances with very low loss. Optical fibers 106 may comprise a suitable type of fiber selected from a variety of different fibers for optical transmission.

Optical transport network 101 may include devices configured to transmit optical signals over optical fibers 106. Information may be transmitted and received through optical transport network 101 by modulation of one or more wavelengths of light to encode the information on the wavelength. In optical networking, a wavelength of light may also be referred to as a channel. Each channel may be configured to carry a certain amount of information through optical transport network 101.

To increase the information capacity and transport capabilities of optical transport network 101, multiple signals transmitted at multiple channels may be combined into a single wideband optical signal. The process of communicating information at multiple channels is referred to in optics as wavelength division multiplexing (WDM). Coarse wavelength division multiplexing (CWDM) refers to the multiplexing of wavelengths that are widely spaced having low number of channels, usually greater than 20 nm and less than sixteen wavelengths, and dense wavelength division multiplexing (DWDM) refers to the multiplexing of wavelengths that are closely spaced having large number of channels, usually less than 0.8 nm spacing and greater than forty wavelengths, into a fiber. WDM or other multi-wavelength multiplexing transmission techniques are employed in optical networks to increase the aggregate bandwidth per optical fiber. Without WDM, the bandwidth in optical networks may be limited to the bit-rate of solely one wavelength. With more bandwidth, optical networks are capable of transmitting greater amounts of information. Optical transport network 101 may be configured to transmit disparate channels using WDM or some other suitable multi-channel multiplexing technique, and to amplify the multi-channel signal.

Optical transport network 101 may include one or more optical transmitters (Tx) 102 configured to transmit optical signals through optical transport network 101 in specific wavelengths or channels. Transmitters 102 may comprise a system, apparatus or device configured to convert an electrical signal into an optical signal and transmit the optical signal. For example, transmitters 102 may each comprise a laser and a modulator to receive electrical signals and modulate the information contained in the electrical signals onto a beam of light produced by the laser at a particular wavelength, and transmit the beam for carrying the signal throughout optical transport network 101.

Multiplexer 104 may be coupled to transmitters 102 and may be a system, apparatus or device configured to combine the signals transmitted by transmitters 102, e.g., at respective individual wavelengths, into a WDM signal.

Optical amplifiers 108 may amplify the multi-channeled signals within optical transport network 101. Optical amplifiers 108 may be positioned before and after certain lengths of fiber 106. Optical amplifiers 108 may comprise a system, apparatus, or device configured to amplify optical signals. For example, optical amplifiers 108 may comprise an optical repeater that amplifies the optical signal. This amplification may be performed with opto-electrical (O-E) or electro-optical (E-O) conversion. In some embodiments, optical amplifiers 108 may comprise an optical fiber doped with a rare-earth element to form a doped fiber amplification element. When a signal passes through the fiber, external energy may be applied in the form of a pump signal to excite the atoms of the doped portion of the optical fiber, which increases the intensity of the optical signal. As an example, optical amplifiers 108 may comprise an erbium-doped fiber amplifier (EDFA).

OADMs 110 may be coupled to optical transport network 101 via fibers 106. OADMs 110 comprise an add/drop module, which may include a system, apparatus or device configured to add or drop optical signals (i.e., at individual wavelengths) from fibers 106. After passing through an OADM 110, an optical signal may travel along fibers 106 directly to a destination, or the signal may be passed through one or more additional OADMs 110 and optical amplifiers 108 before reaching a destination.

In certain embodiments of optical transport network 101, OADM 110 may represent a reconfigurable OADM (ROADM) that is capable of adding or dropping individual or multiple wavelengths of a WDM signal. The individual or multiple wavelengths may be added or dropped in the optical domain, for example, using a wavelength selective switch (WSS) (not shown) that may be included in a ROADM.

As shown in FIG. 1, optical transport network 101 may also include one or more demultiplexers 105 at one or more destinations of network 101. Demultiplexer 105 may comprise a system apparatus or device that acts as a demultiplexer by splitting a single composite WDM signal into individual channels at respective wavelengths. For example, optical transport network 101 may transmit and carry a forty (40) channel DWDM signal. Demultiplexer 105 may divide the single, forty channel DWDM signal into forty separate signals according to the forty different channels.

In FIG. 1, optical transport network 101 may also include receivers 112 coupled to demultiplexer 105. Each receiver 112 may be configured to receive optical signals transmitted at a particular wavelength or channel, and may process the optical signals to obtain (e.g., demodulate) the information (i.e., data) that the optical signals contain. Accordingly, network 101 may include at least one receiver 112 for every channel of the network.

Optical networks, such as optical transport network 101 in FIG. 1, may employ modulation techniques to convey information in the optical signals over the optical fibers. Such modulation schemes may include phase-shift keying (PSK), frequency-shift keying (FSK), amplitude-shift keying (ASK), and quadrature amplitude modulation (QAM), among other examples of modulation techniques. In PSK, the information carried by the optical signal may be conveyed by modulating the phase of a reference signal, also known as a carrier wave, or simply, a carrier. The information may be conveyed by modulating the phase of the signal itself using two-level or binary phase-shift keying (BPSK), four-level or quadrature phase-shift keying (QPSK), multi-level phase-shift keying (M-PSK) and differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant. Additionally, polarization division multiplexing (PDM) technology may enable achieving a greater bit rate for information transmission. PDM transmission comprises modulating information onto various polarization components of an optical signal associated with a channel. The polarization of an optical signal may refer to the direction of the oscillations of the optical signal. The term "polarization" may generally refer to the path traced out by the tip of the electric field vector at a point in space, which is perpendicular to the propagation direction of the optical signal.

In an optical network, such as optical transport network 101 in FIG. 1, it is typical to refer to a management plane, a control plane, and a transport plane (sometimes called the physical layer). A central management host (not shown) may reside in the management plane and may configure and supervise the components of the control plane. The management plane includes ultimate control over all transport plane and control plane entities (e.g., network elements). As an example, the management plane may consist of a central processing center (e.g., the central management host), including one or more processing resources, data storage components, etc. The management plane may be in electrical communication with the elements of the control plane and may also be in electrical communication with one or more network elements of the transport plane. The management plane may perform management functions for an overall system and provide coordination between network elements, the control plane, and the transport plane. As examples, the management plane may include an element management system (EMS), which handles one or more network elements from the perspective of the elements, a network management system (NMS), which handles many devices from the perspective of the network, and an operational support system (OSS), which handles network-wide operations.

Modifications, additions or omissions may be made to optical transport network 101 without departing from the scope of the disclosure. For example, optical transport network 101 may include more or fewer elements than those depicted in FIG. 1. Also, as mentioned above, although depicted as a point-to-point network, optical transport network 101 may comprise any suitable network topology for transmitting optical signals such as a ring, a mesh, or a hierarchical network topology.

As discussed above, the amount of information that may be transmitted over an optical network may vary with the number of optical channels coded with information and multiplexed into one signal. Accordingly, an optical fiber employing a WDM signal may carry more information than an optical fiber that carries information over a single channel. Besides the number of channels and number of polarization components carried, another factor that affects how much information can be transmitted over an optical network may be the bit rate of transmission. The higher the bit rate, the greater the transmitted information capacity. Achieving higher bit rates may be limited by the availability of wide bandwidth electrical driver technology, digital signal processor technology and increase in the required OSNR for transmission over optical transport network 101.

As shown in FIG. 1, optical transport network 101 may employ a digital wrapper technology to encapsulate existing frames of data, which may originate in a variety of native protocols, and may add packetized overhead for addressing, management, and quality assurance purposes. The resulting optical signal, in the form of optical data units (ODUs) may then be transported using individual optical wavelengths by optical transport network 101. The packetized overhead may be used to monitor and control the optical signals being transported using any of a variety of different protocols. In particular embodiments, operation of optical transport network 101 is performed according to optical transport networking (OTN) standards or recommendations promulgated by the International Telecommunications Union (ITU), such as ITU-T G.709—"Interfaces for the Optical Transport Network" and ITU-T G.872—"Architecture of the Optical Transport Network", among others. The optical wavelengths in OTN may rely on a hierarchical implementation of time-division multiplexing (TDM) to optimize carrier wavelength efficiency.

As a result of the hierarchical TDM arrangement of the optical signals in OTN, OTN switching may be performed at different sub-wavelength bit rates along optical transport network 101. As used herein, OTN switching refers to switching ODU paths of different bit rates with the ODU being the atomic unit of switching. In contrast, Internet protocol (IP) switching, such as by an IP router, refers to switching of network signals where an individual IP packet is the atomic unit of switching. In OTN switching, such as in optical transport network 101, an ODU remains in the optical domain outside of an OTN switch from network ingress to network egress. Within the OTN switch, an ODU may be accessed as an electrical domain object and OTN switching may include electrical switching technology.

It is noted that while OTN switching does generally take place in the DWDM domain, ROADMs and DWDM may be formally referred to as layer0 technologies (in The Basic Reference Model for Open Systems Interconnection, also referred to as the OSI Reference Model). In contrast, OTN may be described as a layer1 technology in the OSI Reference Model, which may operate independently of the optical wavelength domain (DWDM). For example, an OTN switch may theoretically operate over dark fiber, galvanic conductors (such as copper), or over a wireless medium (such as a millimeter-scale wave, or radio frequencies).

In general, the term "distributed" may refer to multiple nodes, or network elements (NEs), interconnected by a network and a set of collaborating nodes (or NEs). As used herein, the term "disaggregated" may refer to a NE in a distributed network that is further reorganized into a set of disaggregated sub-components in a physical sense, as compared to an aggregated physical structure, while maintaining the functionality of an integrated NE in a logical sense. In some embodiments, the disaggregated sub-components may be made openly accessible, in contrast to the aggregated physical structure.

In contrast to the centralized and embedded nature of an OTN switch, which is a unitary device at a single central location, a disaggregated OTN switching system is disclosed herein. The disaggregated OTN switching system disclosed herein may enable disaggregation of the core switching functionality with the network interface functionality. The disaggregated OTN switching system disclosed herein may enable OTN switching by relying on an internal Ethernet switching core (also referred to herein as an "Ethernet fabric"). The disaggregated OTN switching system disclosed herein may accordingly enable rapid customized configuration of a particular switching functionality at a particular location or at different remote locations. The disaggregated OTN switching system disclosed herein may enable much lower cost OTN switching than by using an OTN switch. The disaggregated OTN switching system disclosed herein may enable a much greater scalability as compared to the fixed switching capacity that is inherent in an OTN switch, because the Ethernet fabric employed may be external network infrastructure, such as data center switching systems, that can be expanded to a desired capacity. The disaggregated OTN switching system disclosed herein may be implemented using a plurality of plug-in universal (PIU) modules that provide interfacing and transceiving functionality between various OTN signals and Ethernet signals. The disaggregated OTN switching system disclosed herein may be further implemented using PIU blade chassis that have interface slots populated by a number of PIU modules, which are interconnected, powered, and controlled using the PIU blade chassis. Certain ones of PIU modules disclosed herein may enable localized direct OTN switching functionality by interconnecting two or more PIU modules in a loop-back configuration, without the use of a core Ethernet fabric.

Figure 2:
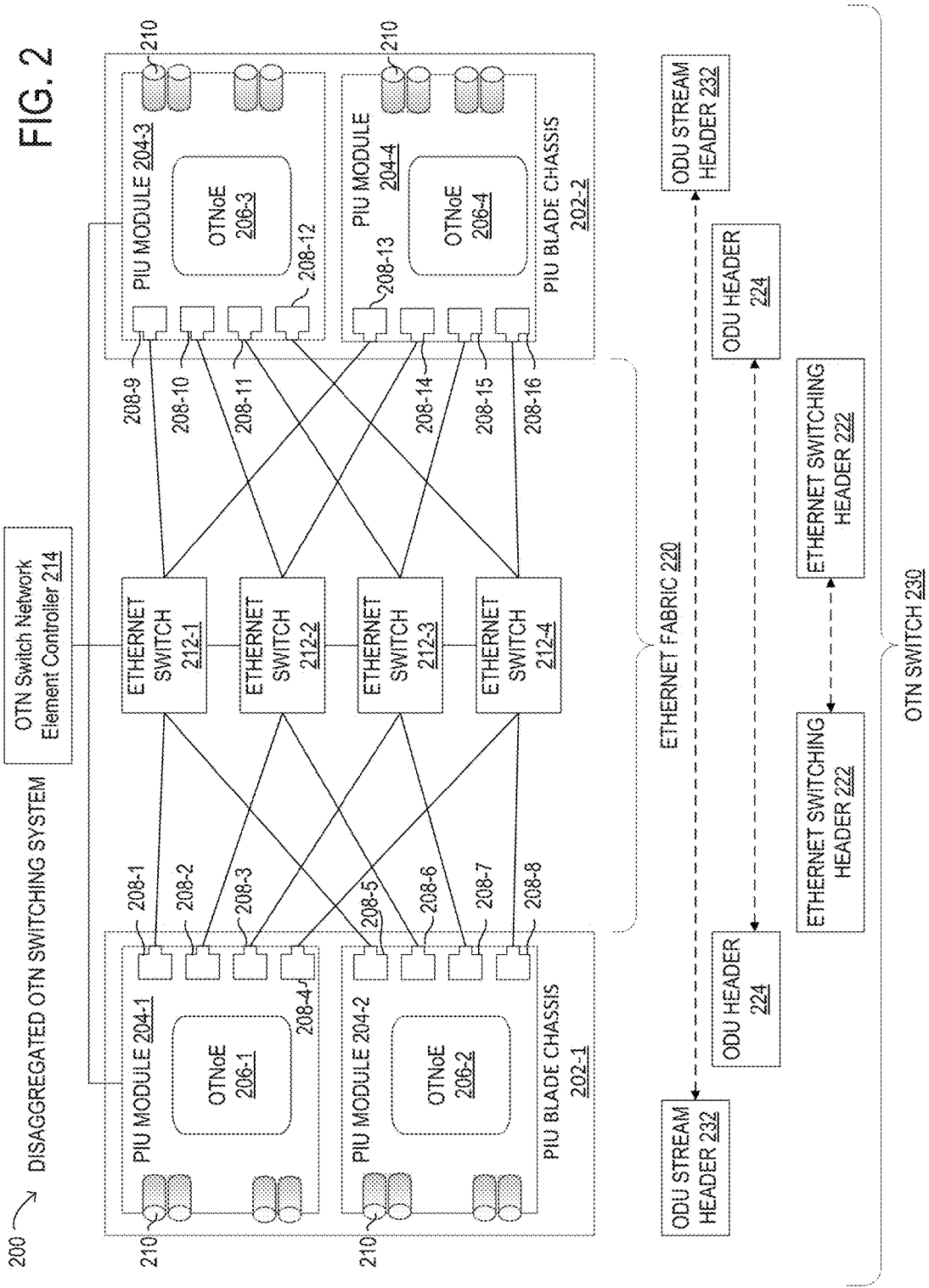
FIG. 2 is a block diagram of selected elements of an embodiment of a disaggregated OTN switching system.

Referring now to FIG. 2, a block diagram of selected elements of an embodiment of a disaggregated OTN switching system 200 is illustrated. Disaggregated OTN switching system 200 in FIG. 2 may be implemented for external switching of optical signals associated with optical transport network 101 (see FIG. 1) and is a schematic diagram for descriptive purposes and is not drawn to scale or perspective. External switching of optical signals refers to switching ODU paths of different bit rates with an ODU being the atomic unit of switching, where the different bit rates may be sub-wavelength bit rates, and the ODU remains in the optical domain outside of an OTN switch 230 from network ingress to network egress. It is noted that within disaggregated OTN switching system 200, an ODU may be accessed as an electrical domain object and OTN switching may include electrical switching technology.

As shown in FIG. 2, disaggregated OTN switching system 200 is configured to function as OTN switch 230, in which optical signals having optical data unit (ODU) stream headers 232 connected to PIU modules 204 may be interconnected and logically switched among PIU modules 204. At the core of disaggregated OTN switching system 200 is an Ethernet fabric 220. Each of PIU modules 204 may function as a transceiver, with OTN inputs and outputs 210 (shown as cylindrical ports) being respectively converted from ODUs each having an ODU header 224 to Ethernet packets each having an Ethernet switching header 222 that are then switchable by one or more Ethernet switches 212. Ethernet fabric 220 may employ Ethernet switches 212 in any kind of Ethernet switching architecture or Ethernet switching domain. In various embodiments, Ethernet fabric 220 may be implemented as a hierarchical spine-leaf architecture, which has become commonplace in many data center rack domains. Thus, each rack may have a so-called top-of-rack (TOR) leaf switch that operates at a relative low data throughput capacity, while the TOR leaf switches are then interconnected using a spine switch that operates at a relatively high data throughput capacity. In this manner, Ethernet fabric 220 may be hierarchically implemented using different numbers of TOR leaf switches and spine switches for any given network switching application, including aggregation into very large throughput Ethernet fabrics 220 that may have data throughput capacity of several dozens of terabytes, or even greater.

The interconnections between PIU modules 204 and Ethernet fabric 220 may be copper cabled connections, such as 1000BASE-CX, 1000BASE-KX, 1000BASE-T, and 1000BASE-TX for 1 GB Ethernet; such as 10GBASE-CX4, small form factor pluggable+ (SFP+), 10GBASE-T, and 10GBASE-KX4 for 10 GB Ethernet; and such as 100GBASE-CR10, 100GBASE-CR4, 100GBASE-KR4, and 100GBASE-KP4 for 100 GB Ethernet, among other potential types of copper-cable based ports. In some embodiments, the interconnections between PIU modules 204 and Ethernet fabric 220 may be optical fiber Ethernet connections that are supported according to a variety of Ethernet standards for optical Ethernet ports. For example, for 100 GB Ethernet interconnections to Ethernet fabric, the interconnections may be any one or more of 100GBASE-SR10, 100GBASE-SR4, 100GBASE-LR4, 100GBASE-ER4, 100GBASE-CWDM4, 100GBASE-PSM4, 100GBASE-ZR, 100GBASE-KR4, and 100GBASE-KP4. For example, for up to 400 GB Ethernet interconnections to Ethernet fabric 220, the interconnections may be any one or more of 400GBASE-SR16, 400GBASE-DR4, 400GBASE-FR8, and 400GBASE-LR8. Furthermore, in certain embodiments, interconnections to Ethernet fabric 220 may utilize FlexEthernet (FlexE) in order to mix different transmission rates across Ethernet fabric 220.

Among the form factors for ports used in PIU modules 204 are quad small form-factor pluggable (QFSP), C form-factor pluggable (CFP, CFP2), and SFP+. For example, on the OTN line side, CFP2 ports supporting analog coherent optics (ACO) may be used in PIU modules 204, such as for 100 gigabit (100 G) or 200 gigabit (200 G) coherent OTN connections.

Each PIU module 204 in disaggregated OTN switching system 200 is further equipped with an OTN over Ethernet (OTNoE) module 206, respectively, which may be an application specific integrated circuit (ASIC), an ASSP (application specific standard product), or a field-programmable gate array (FPGA) that is customized for a particular purpose. OTNoE module 206 in PIU module 204 may provide specific functionality to enable overall operation of disaggregated OTN switching system 200 as OTN switch 230. OTNoE module 206 may be enabled to implement, in the context of disaggregated OTN switching system 200, various types of OTN functionality over Ethernet fabric 220. OTNoE module 206 may support or enable functionality for OTN path redundancy and path protection switching using Ethernet fabric 220. OTNoE module 206 may support or enable functionality for concatenation of OTN path protection domains. OTNoE module 206 may support or enable functionality for distribution of OTN network paths and ODUs associated with the network paths over a 1:N Ethernet fabric connections, where 1 Ethernet switch 212 is used to protect N other working Ethernet switches 212 in case any one of the N working Ethernet switches 212 has a failure or indicates performance of a maintenance operation that may result in an offline state. Furthermore, both 1:N and 0:N protection schemes may be supported. Given the nature of very high speed switching for both OTN applications and for Ethernet fabrics 220, as well as the cost and complexity of using external memory with OTNoE module 206, a latency delay variation may be experienced among Ethernet switches 212. The latency delay variation (or jitter) by Ethernet fabric 220 may be an important factor to consider when choosing an ODU path distribution scheme and a particular Ethernet fabric 220 when a protection scheme is used. OTNoE module 206 may support or enable functionality for ensuring ODU path and data integrity over Ethernet fabric 220, even when jitter occurs over Ethernet fabric 220. OTNoE module 206 may support or enable functionality for switching higher level ODUs over Ethernet fabric 220, even when the data throughput for the higher level ODUs is larger than the underlying Ethernet ports in Ethernet fabric 220. The OTNoE module 206 may support or enable functionality for compressing OTN traffic to provide more efficient connections to Ethernet fabric 220 while compensating for jitter and bit error rate (BER) losses that may occur over Ethernet fabric 220, in order to enable using Ethernet fabric 220 for OTN switching.

Finally, in FIG. 2, an OTN switch network element controller 214 (see also FIGS. 3 and 4) is shown that coordinates operation of PIU blade chassis 202, PIU modules 204, and Ethernet fabric 220. OTN switch network element controller 214 may be a software-defined networking (SDN) controller, a micro-controller unit (MCU), a virtual micro-controller unit (vMCU), or various types of controllers. Specifically, functionality in the OTN switch network element controller 214 may be used to communicate with PIU chassis 202 and Ethernet fabric 220 for OTN switching operations. The OTN switch network element controller 214 may accordingly configure switching paths and switching configurations, using software commands, to enable operation of disaggregated OTN switching system 200 as an OTN switch 230.

Referring now to FIG. 3, a block diagram of selected elements of an embodiment of OTN switch network element controller 300 is illustrated. OTN switch network element controller 300 in FIG. 3 may be implemented to control disaggregated OTN switching system 200 (see FIG. 2) and is a schematic diagram for descriptive purposes.

In FIG. 3, OTN switch network element controller 300 is represented as a computer system including physical and logical components for implementing disaggregated OTN switching system 200, as described herein, and may accordingly include processor 301, memory 310, and network interface 322. Processor 301 may represent one or more individual processing units and may execute program instructions, interpret data, process data stored by memory 310 or OTN Switch Network Element Controller 300. It is noted that OTN switch network element controller 300 may be implemented in different embodiments. For example, in some embodiments, OTN switch network element controller 300 may be implemented using a network element. In particular embodiments, memory 310 may represent a software controller 320 executing on processor 301.

In FIG. 3, memory 310 may be communicatively coupled to processor 601 and may comprise a system, device, or apparatus suitable to retain program instructions or data for a period of time (e.g., computer-readable media). Memory 310 may include various types of components and devices, such as random access memory (RAM), electrically erasable programmable read-only memory (EEPROM), a PCMCIA card, flash memory, solid state disks, hard disk drives, magnetic tape libraries, optical disk drives, magneto-optical disk drives, compact disk drives, compact disk arrays, disk array controllers, or any suitable selection or array of volatile or non-volatile memory. Non-volatile memory refers to a memory that retains data after power is turned off. It is noted that memory 310 may include different numbers of physical storage devices, in various embodiments. As shown in FIG. 3, memory 310 may include software controller 320, among other applications or programs available for execution.

Referring now to FIG. 4, a block diagram of selected elements of an embodiment of OTN switch network element controller 400 is illustrated. FIG. 4 shows further details of software controller 320 for performing SDN operations related to disaggregated OTN switching system 200, as described above.

In FIG. 4, software controller 320 is shown including a repository that may store any of various different abstraction models 412, selected as examples among other abstraction models for descriptive clarity. In some embodiments, abstractions models 412 are defined using YANG, which is a data modeling language for modeling configuration and state data used to manage network devices through a network configuration protocol (NETCONF). Specifically, abstraction model 412 may include a service abstraction model that may model configuration and state data for network services used with optical transport network 101. Abstraction model 412 may include a network abstraction model that may model configuration and state data for network connections used with optical transport network 101. Abstraction model 412 may include a device abstraction model that may model configuration and state data for network devices 420 used in optical transport network 101. Control functions 410 may represent various control functions for network services, network connections, and network devices 420. API 408 may enable control logic 406 to access control functions 410 for network services, network connections, and network devices 420.

As shown in OTN switch network element controller 400, API 414 may enable communication between control logic 406, as well as external applications 416. Some non-limiting examples of external applications 416 that may be used with software controller 320 include orchestrators (NCX, Anuta Networks, Inc., Milpitas, Calif., USA; Exanova Service Intelligence, CENX, Ottawa, Canada), workflow managers (Salesforce Service Cloud, salesforce.com, Inc., San Franciso, Calif., USA; TrackVia, TrackVia, Inc., Denver, Colo., USA; Integrify, Integrify Inc., Chicago, Ill., USA); and analytics applications (Cloud Analytics Engine, Juniper Networks, Inc., Sunnyvale, Calif., USA; Nuage Networks Virtualized Services Directory (VSD), Nokia Solutions and Networks Oy, Espoo, Finland).

In implementations of OTN switch network element controller 400, control logic 406 may comprise internal control logic that remains proprietary, internal, or administratively protected within software controller 320. Non-limiting examples of internal or protected portions of control logic 406 may include complex proprietary algorithms, such as for path computation, and private business logic, such as billing algorithms of the network operator. In disaggregated OTN switching system 200, control logic 406 may include functionality for communicating with PIU chassis 202 and Ethernet fabric 220, as described above.

Furthermore, software controller 320 may interact with various network devices 420 using different network protocols. For example, software controller 320 may interact with network device 420 using software protocol 422 that is a NETCONF protocol, a command line interface (CLI), or a simple network management protocol (SNMP). Network devices 420 may represents routers, switches, or network elements that are included in optical transport network 101. As noted above, network abstraction models 412 may be repositories, such as databases with representations of functions supported by software controller 320, while the actual implementation of the functions is performed by control functions 410. Accordingly, control functions 410 may utilize the different software protocols 422 to access network devices 420.

It is noted that network devices 420 and software protocols 422 are shown in a logical view in FIG. 4 not a physical view. The actual physical connections between network devices 420 and software controller 320 may be different in different embodiments, such as using one or more network connections.

Figure 5:
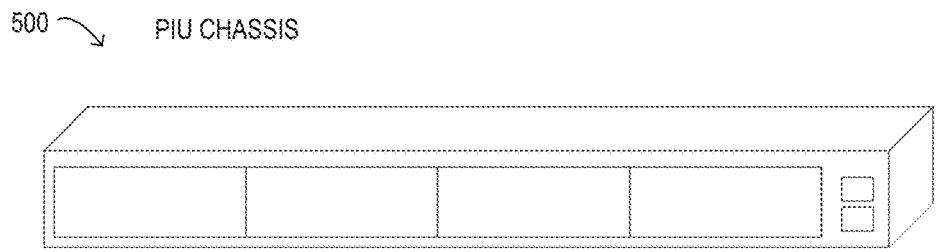
FIG. 5 is a block diagram of selected elements of an embodiment of a PIU chassis.

Referring now to FIG. 5, a representation of selected elements of an embodiment of a PIU chassis 500 is illustrated. PIU chassis 500 may be a rack-mounted enclosure having an internal bus and an internal processor. PIU chassis 500 may receive PIU modules 204 via individual slots that connect PIU module 204 to the internal bus. The internal bus may provide power and coordination among PIU modules 204. In certain embodiments, PIU chassis 500 includes a network connection for direct communication to the OTN switch network element controller 214. As shown PIU chassis 500 has four slots that may be populated with individual PIU modules 204. It is noted that in different embodiments, PIU chassis 500 may be implemented with different numbers of slots and may be implemented in different form factors. It is noted that PIU modules 204 may have front side network connections for access while PIU modules 204 populates a slot in PIU chassis 500.

Figure 6A:
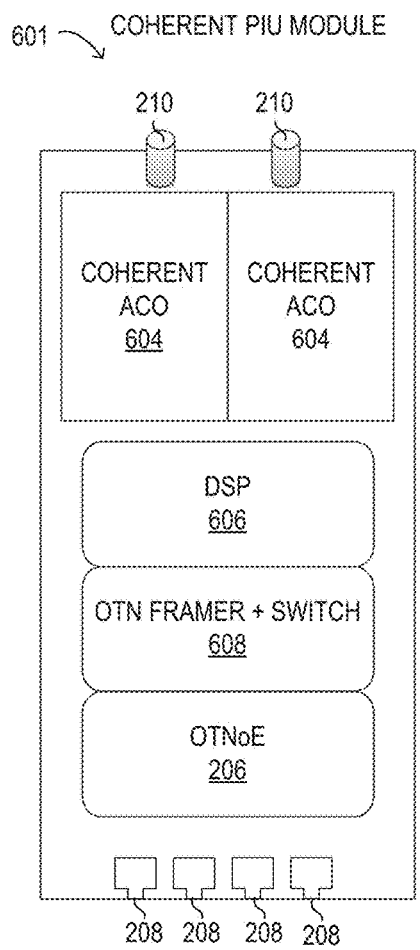
FIGS. 6A, 6B, and 6C are block diagrams of selected elements of embodiments of PIU modules.

Referring now to FIG. 6A, a block diagram of selected elements of an embodiment of a coherent PIU module 601 is illustrated. FIG. 6A is a schematic illustration. Coherent PIU module 601 may populate one slot PIU chassis 500. In the exemplary embodiment shown in FIG. 6A, coherent PIU module 601 is implemented with OTN inputs and outputs 210, two analog coherent optical (ACO) transceivers 604, for example, that support 100 G or 200 G OTN lines and 100 G Ethernet, and a 16×10 G Ethernet/4×40 G Ethernet port 208, and 100 G Ethernet port 208. Coherent PIU module 601 may further include a DSP 606 and an OTN framer+switch 608, along with OTNoE module 206 on the 100 G Ethernet side, as described above. Coherent PIU module 601 may include various connector ports for optical or copper wire based connections, as described above.

Figure 6B:
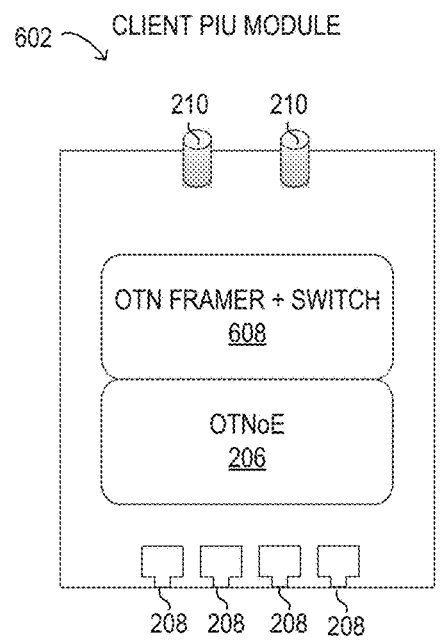

Referring now to FIG. 6B, a block diagram of selected elements of an embodiment of a client PIU module 602 is illustrated. FIG. 6B is a schematic illustration. Client PIU module 602 may populate one slot in PIU chassis 500. In the exemplary embodiment shown in FIG. 6B, client PIU module 602 is implemented with OTN inputs and outputs 210, a 16×10 G Ethernet/4×40 G Ethernet port 208, and 100 G Ethernet port 208. Client PIU module 602 may further include OTN framer+switch 608, along with OTNoE module 206 on the 100 G Ethernet side, as described above. Client PIU module 602 may include various connector ports for optical or copper wire based connections, as described above.

Figure 6C:
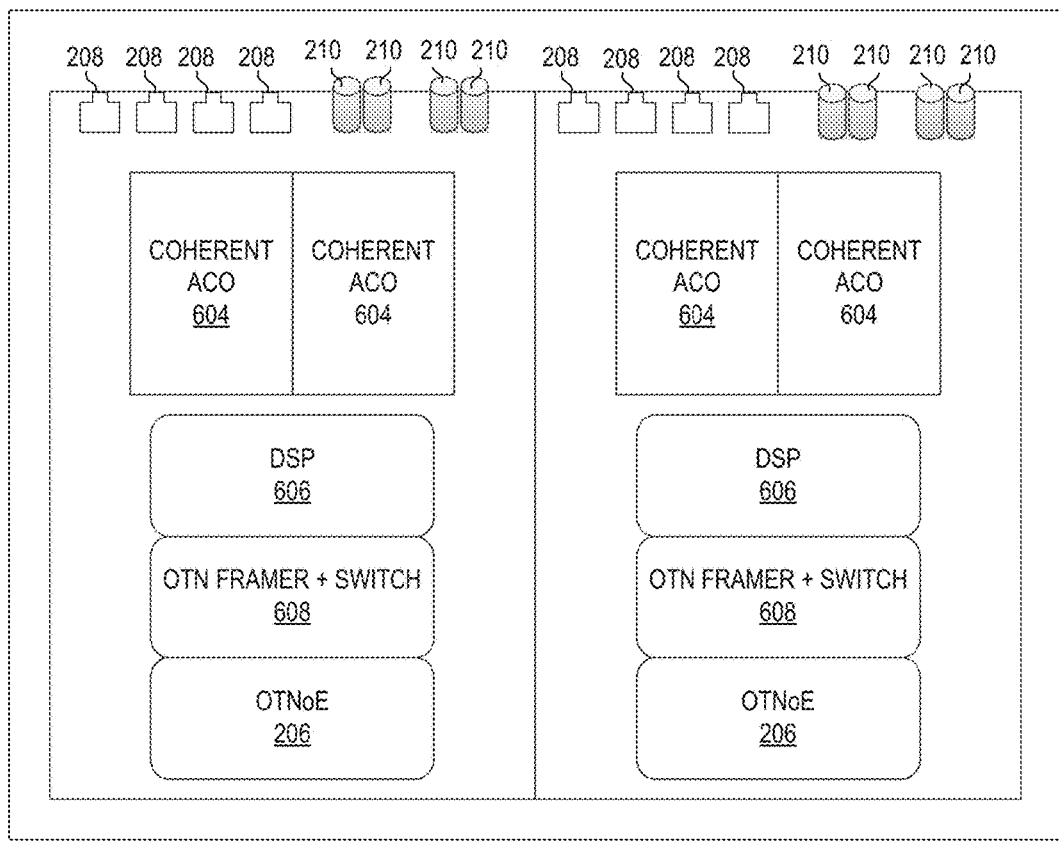

Referring now to FIG. 6C, a block diagram of selected elements of an embodiment of a high density PIU module 603 is illustrated. FIG. 6C is a schematic illustration. High density PIU module 603 may populate two slots in PIU chassis 500. In the exemplary embodiment shown in FIG. 6C, high density PIU module 603 is implemented with two submodules that may be similar to coherent PIU module 601, but where each sub-module may support 2×100 G OTN lines having OTN inputs and outputs 210. High density PIU module 603 may further include two analog coherent optical (ACO) transceivers 604, 1×40 G Ethernet/10×10 G Ethernet client ports 208, 16×10 G Ethernet ports 208, two DSPs 606 and two OTN framer+switches 608, along with two OTNoE modules 206 on the 100 G Ethernet side, as described above. High density PIU module 603 may include various connector ports for breaking out various optical or copper wire based connections, as described above.

Figure 7A:
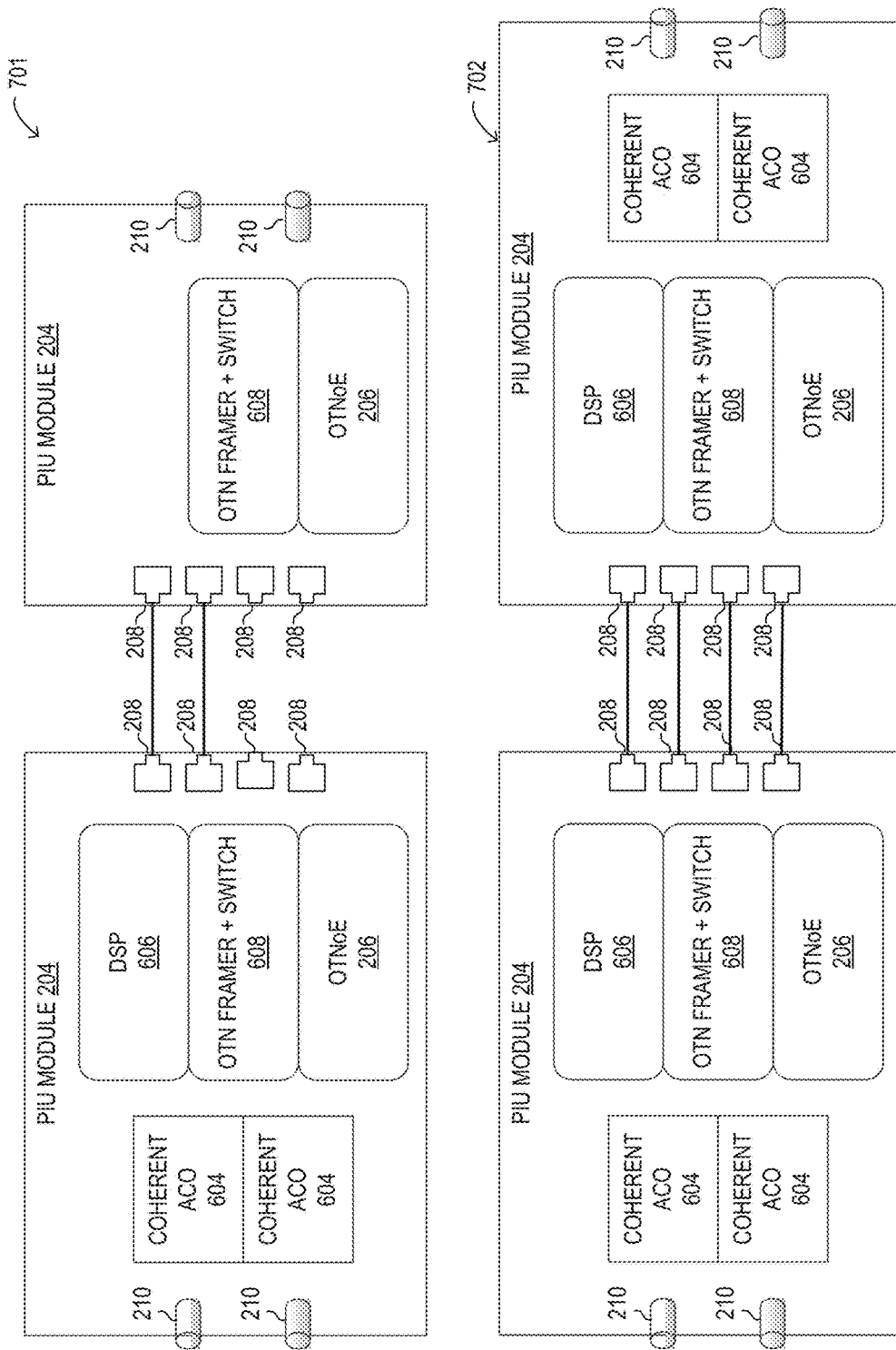
FIGS. 7A and 7B are a block diagrams of selected elements of an embodiment of local OTN switching functionality.
Figure 7B:
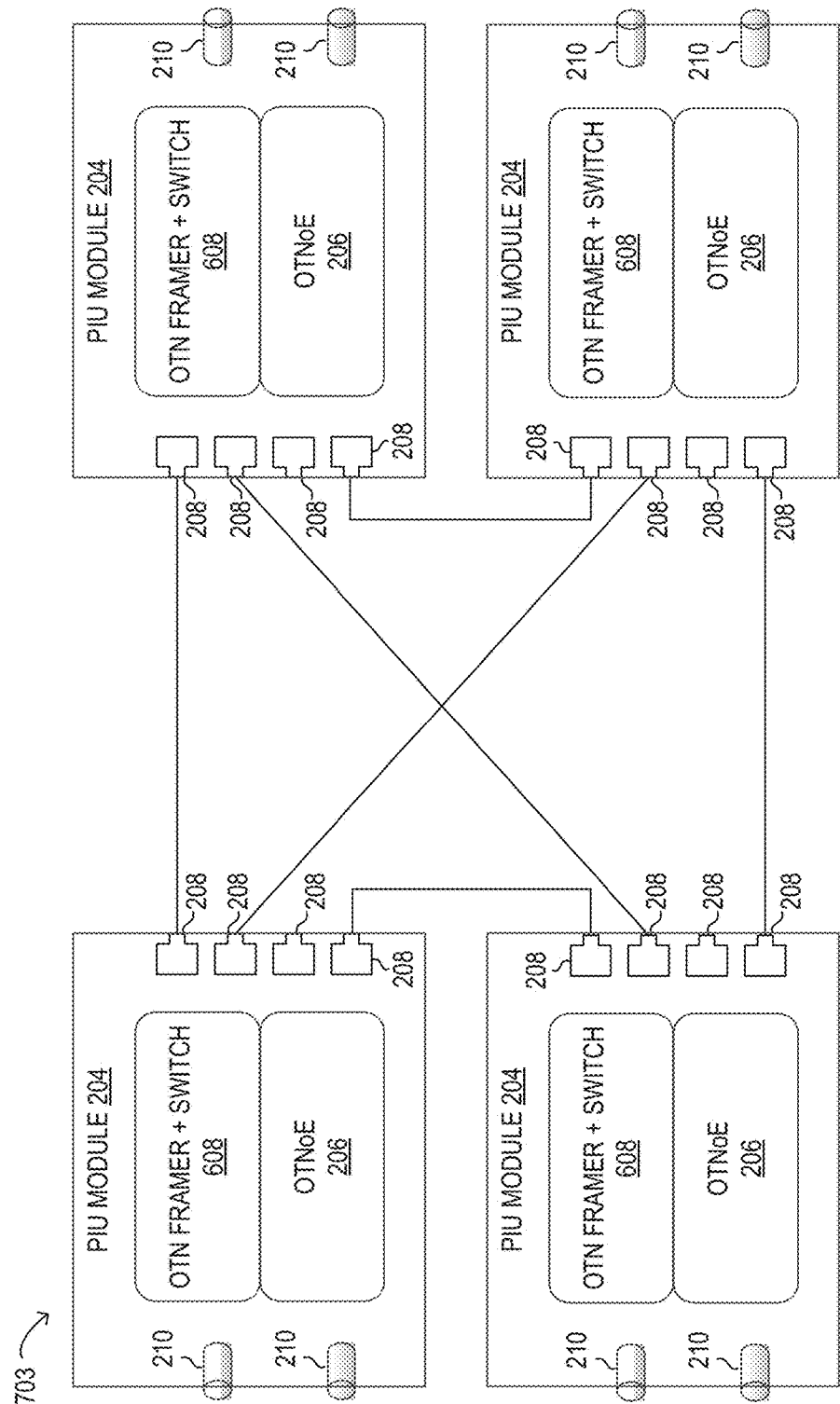

Referring now to FIG. 7A, a block diagram of selected elements of an embodiment of local switching configurations using two directly interconnected PIU modules 604 without a core Ethernet fabric 220 are shown. In the configurations shown in FIG. 7A, the OTN framer+switch 608 may perform OTN switching, along with OTNoE modules 206 among the connected modules. Although certain direct connections are shown in FIG. 7A, it will be understood that local switching configurations using PIU modules 204 may utilize internal connections as well as mesh connection configurations, in which 3 or 4 PIU modules 204 are directly interconnected to enable cross-connections for all participants in the mesh. For example, FIG. 7B illustrates a block diagram of selected elements of an embodiment of local switching using four directly interconnected PIU modules 204 without a core Ethernet fabric 220. In this manner, certain local OTN bi-directional switching functionality using multiple switching nodes may be realized with low complexity and cost.

Figure 8:
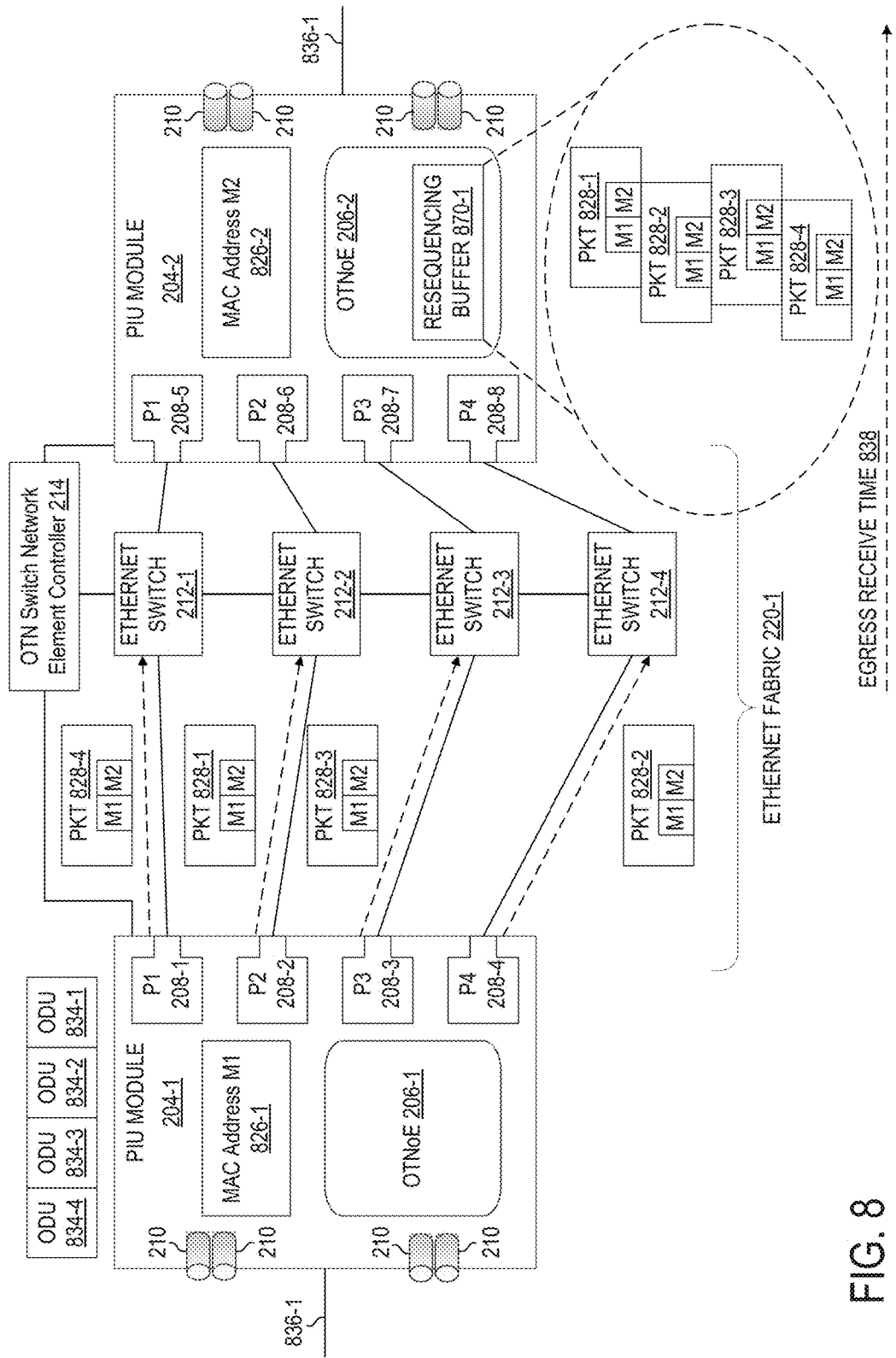
FIG. 8 is a block diagram of an example of optical data unit (ODU) forwarding over an embodiment of an Ethernet fabric.

Referring now to FIG. 8, a block diagram of an example of optical data unit (ODU) forwarding over an Ethernet fabric in an OTN switching system 800 is illustrated. In FIG. 8, OTN switching system 800 is shown in a schematic representation and is not drawn to scale or perspective. It is noted that, in different embodiments, OTN switching system 800 may be operated with additional or fewer elements.

In FIG. 8, optical data units (ODU) including ODU 834 may enter OTN switching system 800 in sequence (834-1, 834-2, 834-3, 834-4) at ingress PIU module 204-1, depicted by ODU switched connection 836-1 representing the arrival of in sequence ODUs 834 at ingress PIU module 204-1. ODU 834s may exit OTN switching system 800 at egress PIU module 204-2 in the same sequence as in ODU switched connection 836-1. In other words, ODU switched connection 836-1 maintains the same sequence of departure of ODU 834s at egress PIU module 204-2 as their in sequence arrival at ingress PIU module 204-1.

In FIG. 8, OTN switching system 800 may establish ODU switched connection 836-1 to enable ODU forwarding of Ethernet packets over Ethernet fabric 220-1 from PIU module 204-1 to PIU module 204-2. ODU switched connection 836-1 may include connections from each of ports 208 of ingress PIU module 204-1 to each of Ethernet switches 212 including the connection from port P1 208-1 to Ethernet switch 212-1, the connection from port P2 208-2 to Ethernet switch 212-2, the connection from port P1 208-3 to Ethernet switch 212-3, and the connection from port P1 208-4 to Ethernet switch 212-4. ODU switched connection 836-1 may also include connections from each of Ethernet switches 212 to each of ports 208 of egress PIU module 204-2 including the connection from Ethernet switch 212-1 to port 208-1, the connection from Ethernet switch 212-2 to port 208-2, the connection from Ethernet switch 212-3 to port 208-3, and the connection from Ethernet switch 212-4 to port 208-4. It is noted that in different embodiments, OTN switching system 800 may establish multiple ODU switched connections 836 (not shown in FIG. 8), each ODU switched connection 836 to enable ODU forwarding over Ethernet fabric 220-1 from one PIU module 204 of multiple PIU modules 204 to another PIU module 204 of multiple PIU modules 204.

OTNoE 206-1 of OTN switching system 800 may receive in sequence ODUs 834 at ingress PIU module 204-1. Each ODU 834 may include ODU header 224 having information that indicates an ingress (also referred herein as a source) PIU module 204 and an egress (also referred herein as a destination) PIU module 204. OTNoE 206-1 uses the information associated with each ODU 834 to determine the destination egress PIU module 204. In the example embodiment, ODUs 834 each include information that indicates ingress PIU module 204 is PIU module 204-1 and egress PIU module 204 is PIU module 204-2. It is noted that in different embodiments, ODU headers 224 of associated ODUs 834 each may include information that indicates the associated ingress PIU module 204 is the same or different amongst ODUs 834 and the associated egress PIU module 204 is the same or different amongst ODUs 834.

In OTN switching system 800, each PIU module 204 is assigned its own unique identifier. The unique identifier may be assigned by OTN switch network element controller 214 during a configuration process of OTN switching system 800 or by OTN switch network element controller 214 when each PIU module 204 is added to OTN switching system 800. PIU module identifier may be a media access control (MAC) address, a virtual local area network (VLAN) identifier, and the like. In the example embodiment, PIU module 204-1 is assigned MAC address M1 826-1 and PIU module 204-2 is assigned MAC address M2 826-2.

OTNoE 206-1 determines from information included in each ODU header 224 of associated ODUs 834 that the destination egress PIU module 204 is PIU module 204-2 and generates each Ethernet packet 828 (PKT) including PKT 828-1 through PKT 828-4 from each corresponding ODU 834-1 through ODU 834-4, respectively. In the example embodiment, there is a one to one correspondence between ODU 834-1 through ODU 834-4 and PKT 828-1 through PKT 828-4. Each generated PKT 828 includes an Ethernet switching header 222 which may include information from each ODU header 224 of associated ODUs 834. Each Ethernet switching header 222 of generated PKTs 828 may also include information that indicates the source MAC address of the ingress PIU module and the destination MAC address of the egress PIU module, where the source MAC address is MAC address M1 826-1 of ingress PIU module 204-1 and the destination MAC address is MAC address M2 826-2 of egress PIU module 204-2, as indicated by M1 and M2 of PKTs 828. The source and destination MAC addresses may be a unicast MAC address, a multicast MAC address, a broadcast MAC address, and the like. The generated PKTs 828 may further include a sequence number assigned to each PKT 828 that indicates the in sequence order of PKTs 828 that corresponds to the in sequence arrival order of ODUs 834. The sequence number of each packets is utilized by the destination egress PIU module 204 to recover and maintain the in sequence arrival order of ODUs 834 at PIU module 204-1, described in further detail below. The generated PKTs 828 may be for transmission via ODU switched connection 836-1 corresponding to ingress PIU module 204-1 and egress PIU module 204-2.

OTNoE 206-1 selects one of ports 208 for transmission of each PKT 828 of PKTs 828 and transmits each PKT 828 of PKTs 828 from its selected port 208 of PIU module 204-1 over Ethernet switch 212 corresponding to the selected port 208. In the example embodiment, OTNoE 206-1 selects port P1 208-1 for transmission of PKT 828-4 and transmits PKT 828-4 from port P1 208-1 over Ethernet switch 212-1, depicted by the dashed arrow from port P1 208-1 to Ethernet switch 212-1. Similarly, OTNoE 206-1 selects port P2 208-2 and transmits PKT 828-1 from port P2 208-2 over Ethernet switch 212-2, depicted by the dashed arrow from port P1 208-2 to Ethernet switch 212-2, selects port P3 208-3 and transmits PKT 828-3 from port P3 208-3 over Ethernet switch 212-3, depicted by the dashed arrow from port P3 208-3 to Ethernet switch 212-3, and selects port P4 208-4 and transmits PKT 828-2 from port P4 208-4 over Ethernet switch 212-4, depicted by the dashed arrow from port P4 208-4 to Ethernet switch 212-4. The connections between ports P1 208-1 through ports P4 208-4 and Ethernet switches 212-1 through 212-4 allow an ingress PIU module 204 to transmit PKTs 828 in parallel on all available Ethernet switches 212. When all N Ethernet switches 212 are available during normal operation, Ethernet fabric 220-1 is in a 0:N load sharing mode. When one of Ethernet switches 212 is unavailable, e.g. due to an equipment failure, an interconnect cable failure, or maintenance, an ingress PIU module 204 transmits PKTs 828 on all remaining available Ethernet switches 212, and therefore, realize fabric protection Ethernet switching.

OTNoE 206-2 may include a re-sequencing buffer 870-1 to store PKTs 828 received at ports 208 of PIU module 204-2. OTNoE 206-2 receives PKTs 828 from Ethernet switches 212 at ports 208 of PIU module 204-2 corresponding to ports P1 208 of PIU module 204-1 and stores PKTs 828 at re-sequencing buffer 870-1 of OTNoE 206-2. In the example embodiment, OTNoE 206-2 receives PKT 828-4 at port P1 208-5, PKT 828-1 at port P2 208-6, PKT 828-3 at port P3 208-7, and PKT 828-2 at port P4 208-8 and stores PKT 828-1 through PKT 828-4 at re-sequencing buffer 870-1. During operation, Ethernet fabric 220-1 may be in load sharing mode, where multiple PKTs 828 may be in transmission over multiple Ethernet switches 212 resulting in arrival packet jitter, which may be intrinsic packet jitter or extrinsic packet jitter.

Intrinsic packet jitter may be due to differences amongst PIU modules 204, interconnects, e.g. cables, Ethernet switches 212, and other components that may comprise OTN switching system 800. Extrinsic packet jitter may be due to multiple ingress PIU modules 204 transmitting multiple Ethernet packets 828 to the same port of the same egress PIU module 204 resulting in varied Ethernet packet arrival times. In other words, intrinsic packet jitter may be defined as originating from all causes other than Ethernet packet 828 collisions or retransmissions, which may be defined as causes for extrinsic packet jitter. In particular, OTN switching system 800 is designed and operated to minimize or eliminate extrinsic packet jitter, such that variations in egress receive time 838 may be assumed to be relatively small and originate from intrinsic packet jitter.

Ethernet fabric 220-1 operating in load sharing mode may result in Ethernet packets 828 arriving at ports 208 of PIU module 204-2 out of sequence to their transmission sequence from PIU module 204-1. In the example embodiment, PKT 828-1 arrives first as depicted by its arrival time with respect to egress receive time 838, PKT 828-3 arrives next, PKT 828-2 arrives next, and PKT 828-4 arrives last. As illustrated, PKTs 828 also overlap each other with respect to egress receive time 838.

OTNoE 206-2 re-assembles ODU 834-1 through ODU 834-4 including re-assembling each ODU header 224 of each ODU 834 from PKT 828-1 through PKT 828-4 stored at re-sequencing buffer 870-1. OTNoE 206-2 re-sequences ODU 834-1 through ODU 834-4 into the same sequence that corresponds to the in sequence arrival order of ODUs 834 at PIU module 204-1 based on the sequence number assigned to each PKT 828 that corresponds to the in sequence arrival order of ODUs 834. OTNoE 206-2 re-assembles each ODU header 224 of each ODU 834 based on information included in each Ethernet switching header 222 of each PKT 828. Once the ODUs 834 are re-assembled and re-sequenced, the ODUs 834 may exit OTN switching system 800 at egress PIU module 204-2 in the same sequence as they entered OTN switching system 800 at ingress PIU module 204-1.

Figure 9:
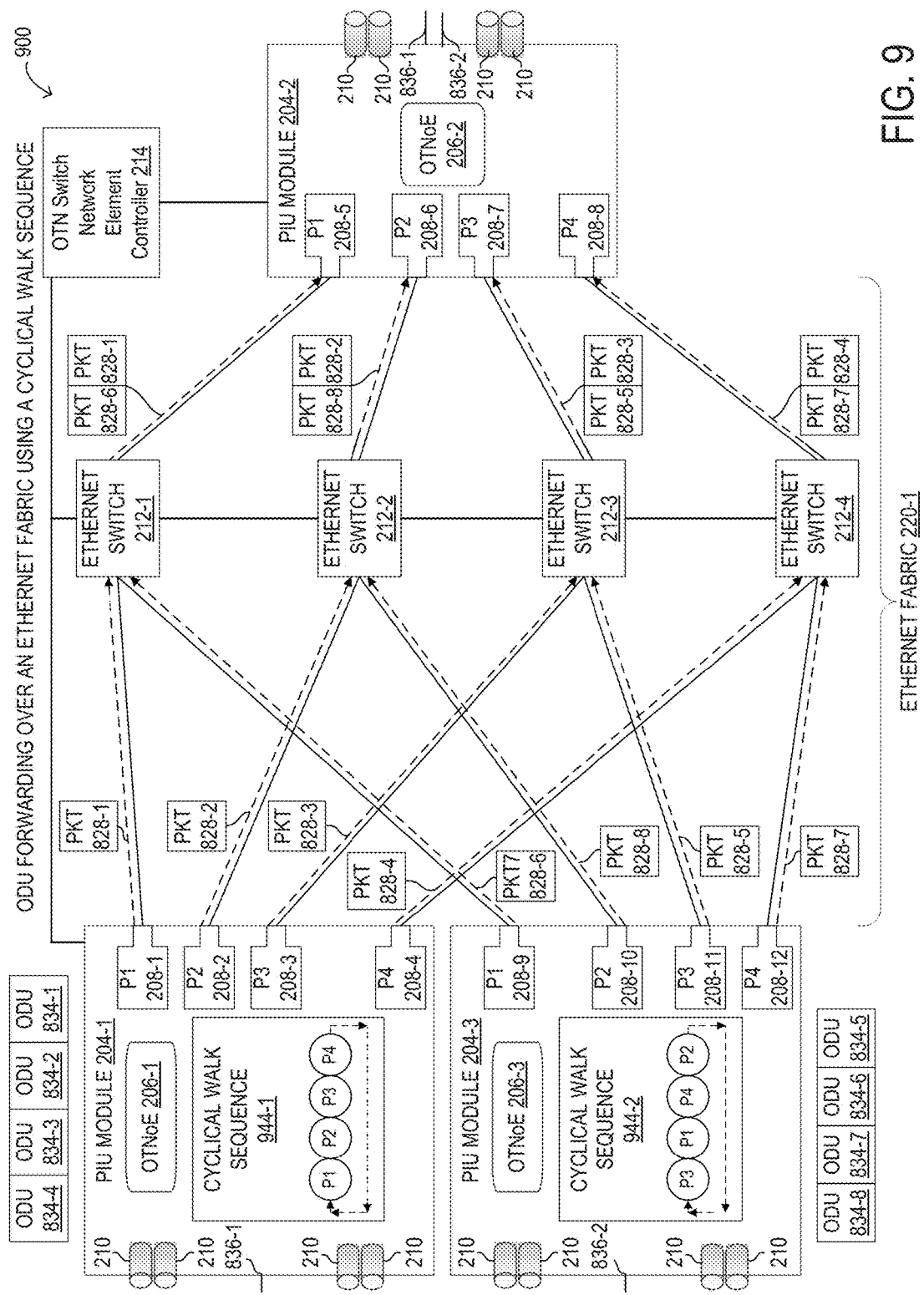
FIG. 9 is a block diagram of an example of ODU forwarding using a cyclical walk sequence over an embodiment of an Ethernet fabric in an OTN switching system.

Referring now to FIG. 9, a block diagram of an example of ODU 834 forwarding using a cyclical walk sequence over an embodiment of Ethernet fabric 220-1 in an OTN switching system 900 is illustrated. In FIG. 9, OTN switching system 900 is shown in a schematic representation and is not drawn to scale or perspective. It is noted that, in different embodiments, OTN switching system 900 may be operated with additional or fewer elements.

In one or more embodiments, OTN switching system 900 may establish one or more ODU switched connections 836 to enable ODU forwarding of Ethernet packets 828 over Ethernet fabric 220-1 from one or more ingress PIU modules 204 to one or more egress PIU modules 204, as previously described. In the example embodiment, OTN switching system 900 may establish a first ODU switched connection 836-1 from ingress PIU module 204-1 to egress PIU module 204-2 and a second ODU switched connection 836-2 from ingress PIU module 204-3 to egress PIU module 204-2. The first ODU switched connection 836-1 includes connections from each of ports P1 208-1 through P4 208-4 of ingress PIU module 204-1 to each of the corresponding Ethernet switches 212-1 through 212-4, and connections from each of Ethernet switches 212-1 through 212-4 to each of the corresponding ports P1 208-5 through P4 208-8 of egress PIU module 204-2. Similarly, the second ODU switched connection 836-2 includes connections from each of ports P1 208-9 through P4 208-8 of ingress PIU module 204-3 to each of the corresponding Ethernet switches 212-1 through 212-4, and connections from each of Ethernet switches 212-1 through 212-4 to each of the corresponding ports P1 208-5 through P4 208-8 of egress PIU module 204-2.

In one or more embodiments, ingress PIU module 204 having ODU switched connection 836 may utilize a method to select an Ethernet switch 212 of a number M of Ethernet switches 212 (also referred herein as an Ethernet plane) for Ethernet packet transmissions based on cyclical walk sequence 944, where cyclical walk sequence 944 is associated with ODU switched connection 836. Cyclical walk sequence 944 may include a sequential order of a number M unique port identifiers, where each of the M port identifiers are respectively associated with each of M ports 208 of ingress PIU module 212. The M unique port identifiers may be in one of a number N different possible sequential orders in the cyclical walk sequence 944, where the N different sequential orders is equal to M factorial divided by M (M!/M). In an embodiment of the method, ingress PIU module 204 may select a first port 208 through an $M^{th}$ port 208 of ingress PIU module 204 and their corresponding first through $M^{th}$ Ethernet switches 212 for transmission of first through $M^{th}$ in sequence Ethernet packets 828 based on first through $M^{th}$ in sequence port identifiers of cyclical walk sequence 944. Ingress PIU module 204 may similarly select a next port 208 and its next Ethernet switch 212 for transmission of the $M+1^{th}$ in sequence Ethernet packet 828 based on the first in sequence port identifier of cyclical walk sequence 944, where the method wraps from the $M^{th}$/last in sequence port identifier back to the first in sequence port identifier of cyclical walk sequence 944. In another embodiment of the method, the port selection may be based on a random port identifier of cyclical walk sequence 944.

In one or more embodiments, an ingress PIU module 204 is assigned a cyclical walk sequence 944 for each OTN switched connection 836 of ingress PIU module 204. In an embodiment, an egress PIU module 204 selects a cyclical walk sequence 944 and sends it to ingress PIU module 204, where it is received and stored at ingress PIU module 204. In another embodiment, OTN switch network element controller 214, on behalf of egress PIU module 204, selects cyclical walk sequence 944 to be stored at egress PIU module 204. In FIG. 9, egress PIU module 204-2 selects the first cyclical walk sequence 944-1 for PIU module 204-1 and the second cyclical walk sequence 944-2 for PIU module 204-3.

When multiple ODU switched connections 836 of multiple ingress PIU modules 204 each specify a single egress PIU module 204, each ingress PIU module 204 may utilize its assigned cyclical walk sequence 944 to help avoid each ingress PIU module 204 from synchronizing its selection of the same Ethernet switch 212 with the other ingress PIU modules 204 and inundating the single egress PIU module 204 with Ethernet packets 828 from the same Ethernet switch 212. By assigning different cyclical walk sequences 944 to each ingress PIU module 204, the probability of synchronization of Ethernet switch selection may be minimized allowing OTN switching system 900 to use smaller buffers to endure a sizable influx of Ethernet packets 828 when ingress PIU modules 204 do synchronize their Ethernet switch selections.

In one or more embodiments, ingress PIU module 204 may maintain a consecutive transmission port count for each port 208 of ingress PIU module 204. Each consecutive transmission port count is based on consecutive Ethernet packet 828 transmissions to a single port 208, where Ethernet packet 828 transmissions are associated with different Ethernet switched connections 836. When ingress PIU module 204 determines that it is transmitting an Ethernet packet 828 to the same port 208 of ingress PIU module 204, the associated consecutive transmission port count is incremented.

When the ingress PIU module 204 is selecting the next port 208 for transmission of an in sequence Ethernet packet 828 based on the current in sequence port identifier of cyclical walk sequence 944, and ingress PIU module 204 determines that the consecutive transmission port count exceeds a consecutive transmission port count threshold value associated with the next port 208, PIU module 204 skips the current in sequence port identifier and selects the next port 208 based on the next in sequence port identifier of cyclical walk sequence 944. Selecting ports 208 in the above manner further minimizes the probability of synchronization of Ethernet switch 212 selection may be minimized In FIG. 9, OTN switching system 900 may select, for ingress PIU module 204-1, a first cyclical walk sequence 944-1 having a first sequential order of ports P1 208-1 through P4 208-4 for ODU forwarding of Ethernet packets PKT 228-1 through PKT 228-4 from ingress PIU module 204-1 to egress PIU module 204-2, where the first cyclical walk sequence 944-1 corresponds to the first ODU switched connection 836-1, ports P1 208-1 through P4 208-4 of PIU module 204-1 correspond to Ethernet switches 212-1 through 212-4, and each PKT 228-1 through PKT 228-4 correspond to ODU 834-1 through ODU 834-4, respectively. Similarly, OTN switching system 900 may select, for ingress PIU module 204-3, a second cyclical walk sequence 944-2 having a second sequential order of ports P1 208-9 through P4 208-8 for ODU forwarding of Ethernet packets PKT 228-5 through PKT 228-8 from ingress PIU module 204-3 to egress PIU module 204-2, where the second cyclical walk sequence 944-2 corresponds to the second ODU switched connection 836-2, ports P1 208-9 through P4 208-8 of PIU module 204-3 correspond to Ethernet switches 212-1 through 212-4, and each PKT 228-5 through PKT 228-8 correspond to ODU 834-5 through ODU 834-8, respectively.

In FIG. 9, the first cyclical walk sequence 944-1 having four port identifiers in the first sequential order of P1, P2, P3, and P4, where port identifier P1 corresponds to P1 208-1 and Ethernet switch 212-1, port identifier P2 corresponds to P2 208-2 and Ethernet switch 212-2, port identifier P3 corresponds to P3 208-3 and Ethernet switch 212-3, and port identifier P4 corresponds to P4 208-4 and Ethernet switch 212-4. The second cyclical walk sequence 944-2 having four port identifiers in the second sequential order of P3, P1, P4, and P2, where port identifier P1 corresponds to P1 208-9 and Ethernet switch 212-1, port identifier P2 corresponds to P2 208-10 and Ethernet switch 212-2, port identifier P3 corresponds to P3 208-11 and Ethernet switch 212-3, and port identifier P4 corresponds to P4 208-8 and Ethernet switch 212-4. The first sequential order and the second sequential order are two of six possible sequential orders of four port identifiers, 4 factorial divided by 4 (4!/4).

FIG. 9, OTNoE 206-1 of OTN switching system 900 may receive in sequence ODUs 834-1 through 834-4 at ingress PIU module 204-1 and OTNoE 206-2 may receive in sequence ODUs 834-5 through 834-8 at ingress PIU module 204-3. ODUs 834-1 through 834-4 and 834-5 through 834-8 may have constant data bit rate, and may be well behaved because ODU switched connections 836 allow transmissions of Ethernet packets 828 from a number M of ports 208 of an ingress PIU module 204 to M Ethernet switches 212 at matching data rates, which may result in minimal congestion that could cause delay variations to the recovery of ODUs 834 at an egress PIU module 204. OTNoE 206-1 generates PKTs 828-1 through 828-4 corresponding to ODUs 834-1 through 834-4, where ODUs 834-1 through 834-4 are for transmission via the first ODU switched connection 836-1. OTNoE 206-2 similarly generates PKTs 828-5 through 828-8 corresponding to ODUs 834-5 through 834-8, where ODUs 834-5 through 834-8 are for transmission via the second ODU switched connection 836-2.

OTNoE 206-1 may transmit the first PKT 828-1 from port P1 208-1 of ingress PIU module 204-1 to egress PIU module 204-2 via Ethernet switch 212-1, where port P1 208-1 may be selected based on the first port identifier, P1, in the first sequential order of the first cyclical walk sequence 944-1. OTNoE 206-1 may transmit the second, third, and fourth PKTs 828-2 through 828-4 from ports P2 208-2, P3 208-3, and P4 208-4 of ingress PIU module 204-1 to egress PIU module 204-2 via Ethernet switches 212-2, 212-3, and 212-4, where ports P2 208-2, P3 208-3, and P4 208-4 may be selected based on the second, third, and fourth port identifiers, P2, P3, and P4 in the first sequential order of the first cyclical walk sequence 944-1. OTNoE 206-1 may transmit the next in-sequence PKT 828 from port P1 208-1, where P1 208-1 may be selected based on wrapping around from the 4th/last in-sequence port identifier P4 to 1st/next port identifier P1 in the first sequential order of the first cyclical walk sequence 944-1.

Similarly, OTNoE 206-2 may transmit the first, second, third, and fourth PKTs 828-5 through 828-8 from ports P3 208-11, P1 208-9, P4 208-8, and P2 208-10 of ingress PIU module 204-3 to egress PIU module 204-2 via Ethernet switches 212-3, 212-1, 212-4, and 212-2 where ports P3 208-11, P1 208-9, P4 208-8, and P2 208-10 may be selected based on the first, second, third, and fourth port identifiers, P3, P1, P4, and P2 in the second sequential order of the second cyclical walk sequence 944-2. OTNoE 206-2 may transmit the next in-sequence PKT 828 from port P3 208-11, where P3 208-11 may be selected based on wrapping around from the 4th/last in-sequence port identifier P2 to 1st/next port identifier P3 in the second sequential order of the second cyclical walk sequence 944-2. In FIG. 9, the transmission of PKTs 828-1 through 828-4 from each selected port 208 of ingress PIU module 204-1 to Ethernet switches 212 and PKTs 828-5 through 828-8 from each selected port 208 of ingress PIU module 204-3 to Ethernet switches 212 are shown by dashed line arrows between each selected port 208 and each corresponding Ethernet switch 212.

In FIG. 9, OTNoE 206-3 of egress PIU module 204-2 may receive PKTs 828-1 and 828-6 from ingress PIU modules 204-1 and 204-3 via Ethernet switch 212-1 at port P1 208-5, depicted by the dashed arrow from Ethernet switch 212-1 to port P1 208-5, PKTs 828-2 and 828-8 from Ethernet switch 212-2 at port P2 208-6, depicted by the dashed arrow from Ethernet switch 212-2 to port P1 208-6, PKTs 828-3 and 828-5 from Ethernet switch 212-3 at port P3 208-7, depicted by the dashed arrow from Ethernet switch 212-3 to port P1 208-7, and PKTs 828-4 and 828-7 from Ethernet switch 212-4 at port P4 208-8, depicted by the dashed arrow from Ethernet switch 212-4 to port P1 208-8.

Figure 10:
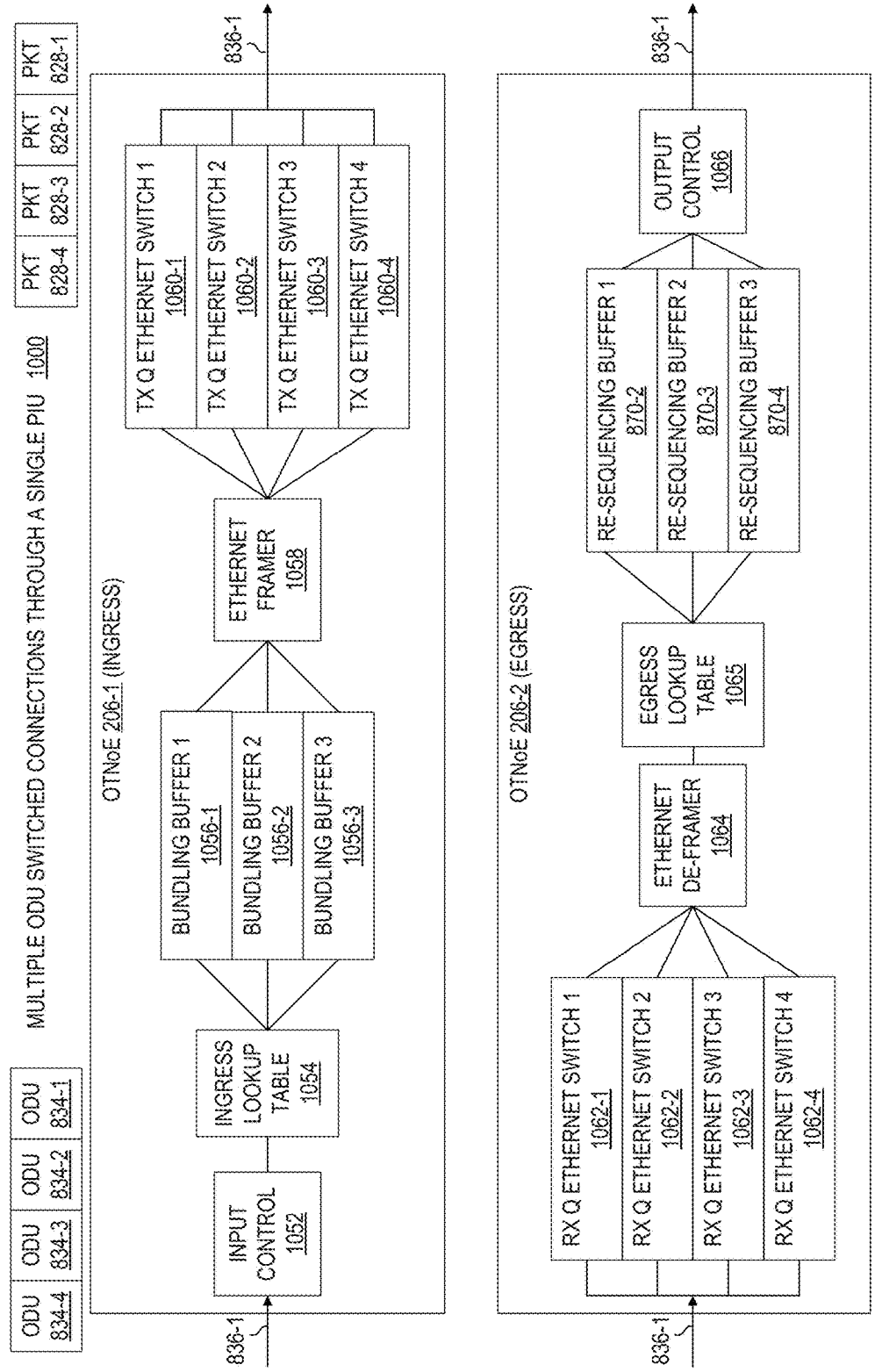
FIG. 10 is a block diagram of multiple ODU switched connections through an embodiment of a single PIU module.

Referring now to FIG. 10, a block diagram of an example of multiple ODU switched connections 836 through a single PIU module 204 in an OTN switching system 1000 is illustrated. In FIG. 10, OTN switching system 1000 is shown in a schematic representation and is not drawn to scale or perspective. It is noted that, in different embodiments, OTN switching system 1000 may be operated with additional or fewer elements.

In OTN switching system 1000, multiple ODUs 834 may be bundled into a single Ethernet packet 828 to minimize the latency of Ethernet packet transmissions over Ethernet fabric 220 and minimize the memory utilized for these transmissions. Only ODUs 834 associated with the same Ethernet switched connection 836 may be bundled into a single Ethernet packet PKT 828. The in sequence order of the ODUs 834 are bundled into the same Ethernet packet PKT 828 in in-sequence order.

OTNoE 206-1 and 206-2 may utilize ingress lookup table 1054 and egress lookup tables 1054, respectively, with local indexing to allow table lookup functions to be deterministic within a single lookup cycle, as described in further detail below. When OTNoEs 206 are implemented as field programmable gate arrays (FPGA) and operated in this manner the size of FPGA memory may be reduced. OTN switching system 1000 has a system wide look up table of Ethernet switched connections 836 having a respective Ethernet switched connection 836 identification that includes entries for every Ethernet switched connection 836 for every ingress PIU module 204 and egress PIU module 204 in OTN switching system 1000. To enable efficient table lookup functions to be performed by OTNoEs 206, each OTNoE 206 has a local ingress lookup table 1054 and an egress lookup table 1065 that are based on a portion of the system wide lookup table, where the local ingress lookup table 1054 includes entries for the Ethernet switched connections 836 associated with PIU module 204-1 and its associated egress PIU module 204-2, and the local egress lookup table 1065 includes entries for the Ethernet switched connections 836 associated with egress PIU module 204-2 and its associated ingress PIU modules 204-1. By distributing the system wide lookup table to a local ingress lookup table 1054 for ingress OTNoE 206-1 and a local egress lookup table 1065 for egress OTNoE 206-2, the size of the local tables are reduced and the lookup functions performed using these local lookup tables 1054 can be more efficient and deterministic.

OTNoE 206-1 of OTN switching system 1000 may receive a first ODU 834-1 having a first ODU header 224-1 at an input control 1052, where the first ODU header 224-1 includes information that indicates PIU module 204-2 is the destination egress PIU module 204-2 of the first ODU 834-1. Input control 1052 may perform a table lookup of ingress lookup table 1054 (ILT) having a plurality of ILT entries to retrieve a first ILT entry based on egress PIU module 204-2 being the destination egress PIU module 204-2 of the first ODU 834-1. In an embodiment, input control 1052 may perform the table lookup by using an ILT table index as a direct index to the first ILT entry of ILT 1054, where the ILT table index is based on egress PIU module 204-2. OTNoE 206-1 may store the first ODU 828 at a first location of a bundling buffer 1 1056-1, where information included in the first ILT entry indicates that bundling buffer 1 1056-1 is to be used to store ODUs 834 associated with egress PIU module 206-2.

OTNoE 206-1 may receive a second ODU 834-2 that indicates egress PIU module 204-2 is the destination egress PIU module 204-2. Input control 1052 may retrieve a second ILT entry of ILT 1054 based on ODU 834-2, as described above. OTNoE 206-1 may store the second ODU 834-2 at a next in sequence second location of bundling buffer 1 1056-1 based on the second ILT entry. Ethernet framer 1058 may generate a first Ethernet packet PKT 828-1 including a first Ethernet switching header 222-1 corresponding to the first ODU 834-1 and the second ODU 834-2 stored at the first and second locations of bundling buffer 1 1056-1 based on the first and second ILT entries, as previously described, where the first Ethernet switching header 222-1 includes a first sequence number, the first ILT table index, a first egress lookup table (ELT) index stored at the first ILT entry, and an Ethernet switched connection 836-1 stored at the first ILT entry. Ethernet framer 1058 may store the first Ethernet packet PKT 828-1 at a first transmit queue of a plurality of transmit queues including TX Q Ethernet Switch 1 1061-1 through TX Q Ethernet Switch 4 1061-1 for transmission to egress PIU module 206-2, where the first transmit queue TX Q Ethernet Switch 1 1061-1 is selected by OTNoE 206-1 based on cyclical walk sequence 944-1.

Ethernet de-framer 1064 of egress OTNoE 206-2 may retrieve the first Ethernet packet PKT 828-1 stored at a first receive queue of a plurality of receive queues including RX Q Ethernet Switch 1 1062-1 through RX Q Ethernet Switch 4 1061-4, where the first receive queue is RX Q Ethernet Switch 1 1062-1. OTNoE 206-2 may perform a table lookup of an ELT table 1065 having a plurality of ELT entries to retrieve a first ELT entry of ELT 1065 based on the first ELT index of the first Ethernet switching header 222-1. OTNoE 206-2 may store the first Ethernet packet PKT 828-1 at a first location of a re-sequencing buffer 870 of a plurality of re-sequencing buffers 870 including re-sequencing buffer 1 870-2 through re-sequencing buffer 3 870-4, where information included in the first ELT entry indicates that re-sequencing buffer 1 870-2 is to be used to store Ethernet packets PKT 828 associated with the first ELT entry, and the first location of re-sequencing buffer 1 870-2 is based on the first sequence number of the first Ethernet switching header 222-1 of PKT 828-1. Output control 1066 of OTNoE 206-2 may recover the first in sequence ODU 834-1 and the second in sequence ODU 834-2 from Ethernet packet PKT 828-1 based on information in Ethernet switching header 222-1 of PKT 828-1 for transmission to the OTN networking system 1000.

OTN switching system 1000 may provide an environment to enable ODU clock synchronization and clock recovery. In order to provide this environment, OTN switching system 1000 may provide a single clock source to both ingress PIU module 204-1 and egress PIU module 204-1 so that ingress OTN framer+switch 608-1 and egress OTN framer+switch 608-2 may use the sigma-delta clock recovery method to recover an ODU clock using timestamps and a number of bytes transferred from ingress OTN framer+switch 608-1 to egress OTN framer+switch 608-2. Ingress PIU module 204-1 and egress PIU module 204-1 synchronize their ODU clock interfaces to the single clock source provided by OTN switching system 1000, or derived from OTN overhead information to enable ODU clock recovery.

OTN switching system 1000 also provides in-sequence delivery of ODUs for each ODU path, between ingress OTN framer+switch 608-1 and egress OTN framer+switch 608-2, even when Ethernet fabric 220 may produce out of order delivery of Ethernet frames, as previously described.

OTN switching system 1000 further provides continuous ODU delivery to egress OTN framer+switch 608-2 in spite of any delays and jitters caused by Ethernet fabric 220, and buffers extra jitters that egress OTN framer+switch 608-2 may be unable to handle. There are two places that de-jittering of ODUs occurs, a limited capability is provided in egress OTN framer+switch 608-2 and in a re-sequencing buffer 870 on a per ODU path basis. Re-sequencing is performed on Ethernet packets 828 level. Once Ethernet packets 828 are re-assembled back in-sequence, Ethernet packet 828 overhead can be removed and ODUs are delivered to egress OTN framer+switch 608-2. In order to prevent re-sequencing buffer 870 underrun due to Ethernet fabric jitter, a watermark is set for each re-sequencing buffer 870 to allow buffering of some Ethernet packets 828 prior to delivery of ODUs to egress OTN framer+switch 608-2. Ethernet fabric jitter and Ethernet packet collision may also cause re-sequencing buffer 870 to build up beyond the watermark. In order to reduce internal memory requirements of OTNoE 206, re-sequencing buffers 870 are shared for all ODU paths of PIU modules 204, where re-sequencing buffers 870 may have buffer descriptors that are queued, linked, to allow for more efficient re-ordering. In OTN switching system 1000, per ODU path back-pressure may occur between egress OTN framer+switch 608-2 and re-sequencing buffer 870. Egress OTNoE 206-2 delivers ODUs 834 to egress OTN framer+switch 608-2. Egress OTN framer+switch 608-2 may utilize flow control to control the rate of emission of ODUs 834 for each specific ODU path from egress OTNoE 206-2.

Ingress OTN framer+switch 608-1 provides the number of bytes of each original ODU in each subsequent Ethernet packet header between two adjacent timestamps at egress OTN framer+switch 608-2, even in cases where there is ODU loss or ODU corruption. When an Ethernet packet 828 is lost, the number of bytes in the next Ethernet packet header of Ethernet packet 828 on the same ODU path will be used to deliver the number of bytes missing on the ODU stream. The content of the lost Ethernet packet 828 will be lost but the clock information can be recovered.

Figure 11:
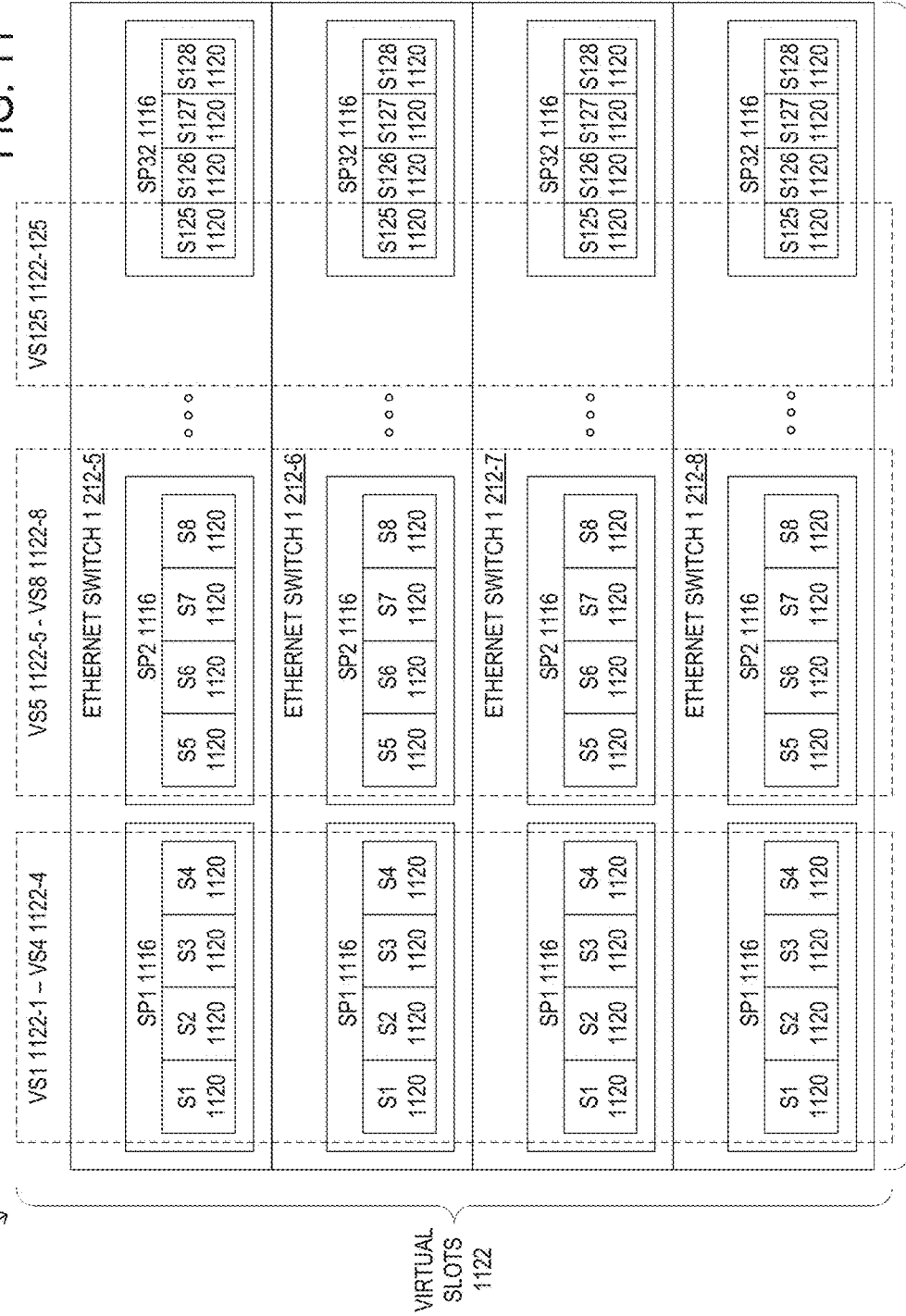
FIG. 11 is a block diagram of an embodiment of virtual slots in an Ethernet switch fabric.

Referring now to FIG. 11, a block diagram of an embodiment of selected elements of virtual slots in an Ethernet switch fabric 1100 is illustrated. It is noted that FIG. 11 is a schematic diagram for descriptive purposes and is not drawn to scale or perspective. As shown, each Ethernet switch 212-5 through 212-8 includes 32 respective Ethernet switch ports 1116 SP1-SP32. As shown in FIG. 11, each of the 32 respective Ethernet switch ports 1116 SP1-SP32 may be divided into four Ethernet switch sub-ports 1120 for a total of 128 Ethernet switch sub-ports 1120 S1-S128. Each of Ethernet switch ports 1116 may include a quad small form-factor pluggable (QSFP) transceiver. For example, the QSFP transceiver of each Ethernet switch port 1116 may be a QSFP28 transceiver. For instance, the QSFP28 transceiver of each Ethernet switch port 1116 may support and enable a 100 GE (one hundred gigabit Ethernet) connection to respective Ethernet switches.

In one or more embodiments, Ethernet switch sub-ports 1120 of respective Ethernet switches 212 of Ethernet fabric 220-2 may form multiple virtual slots 1122. The multiple virtual slots 1122 may include a logical aggregation of multiple consecutive Ethernet switch sub-ports 1120. For example, as illustrated, Ethernet switch sub-ports 1120 S1-S4 of respective Ethernet switches 212 may form virtual slots VS1 1122-1-VS4 1122-4. Other virtual slots 1122 may include other Ethernet switch sub-ports 1120, of respective Ethernet switches 212, to form other virtual slots 1122. For example, Ethernet switch sub-ports 1120 S5-S8 of respective Ethernet switches 212 may form virtual slots VS5 1122-5-VS8 1122-8. Ethernet switch sub-port 1120 S125 may form virtual slot VS125 1122-125. Ethernet fabric 220-2 may include a number P of Ethernet switch sub-ports 1120 of Ethernet switches 212, where P is greater than one. Ethernet fabric 220-2 may also include P virtual slots 1122 corresponding to respective Ethernet switch sub-ports 1120 of Ethernet switches 212. A variable k having a value ranging from 1 to P denotes the kth Ethernet switch sub-port 1120 Sk corresponding to one of the P Ethernet switch sub-ports 1120. The variable k also denotes the kth virtual slot 1122 VSk having a virtual slot number of k corresponding to one of the P virtual slots.

A virtual slot 1122 may be associated with a virtual slot address that is unique to the virtual slot 1122 in the Ethernet fabric 220-2, where the virtual slot address may be set to the Ethernet switch sub-port number k of the starting Ethernet switch sub-port 1120 of the virtual slot 1122. For example, virtual slot VS125 1122-125 starts with Ethernet switch sub-port 1120 S125 having the Ethernet switch sub-port number 125 and its virtual slot address is set to 125. In one or more other embodiments, the virtual slot address may be set to the virtual slot number k of the starting virtual slot 1122 of the virtual slot. For example, the virtual slot address of virtual slots VS1 1122-1-VS4 1122-4 may be set to 1 that is unique in Ethernet fabric 220-2. In another example, virtual slots VS5 1122-5-VS8 1122-8 may be associated with a virtual slot address set to 5 that is also unique in Ethernet fabric 220-2. In yet another example, virtual slot VS125 1122-125 may be associated with a different virtual slot address, 5, which is also unique in Ethernet fabric 220-2.

Figure 12:
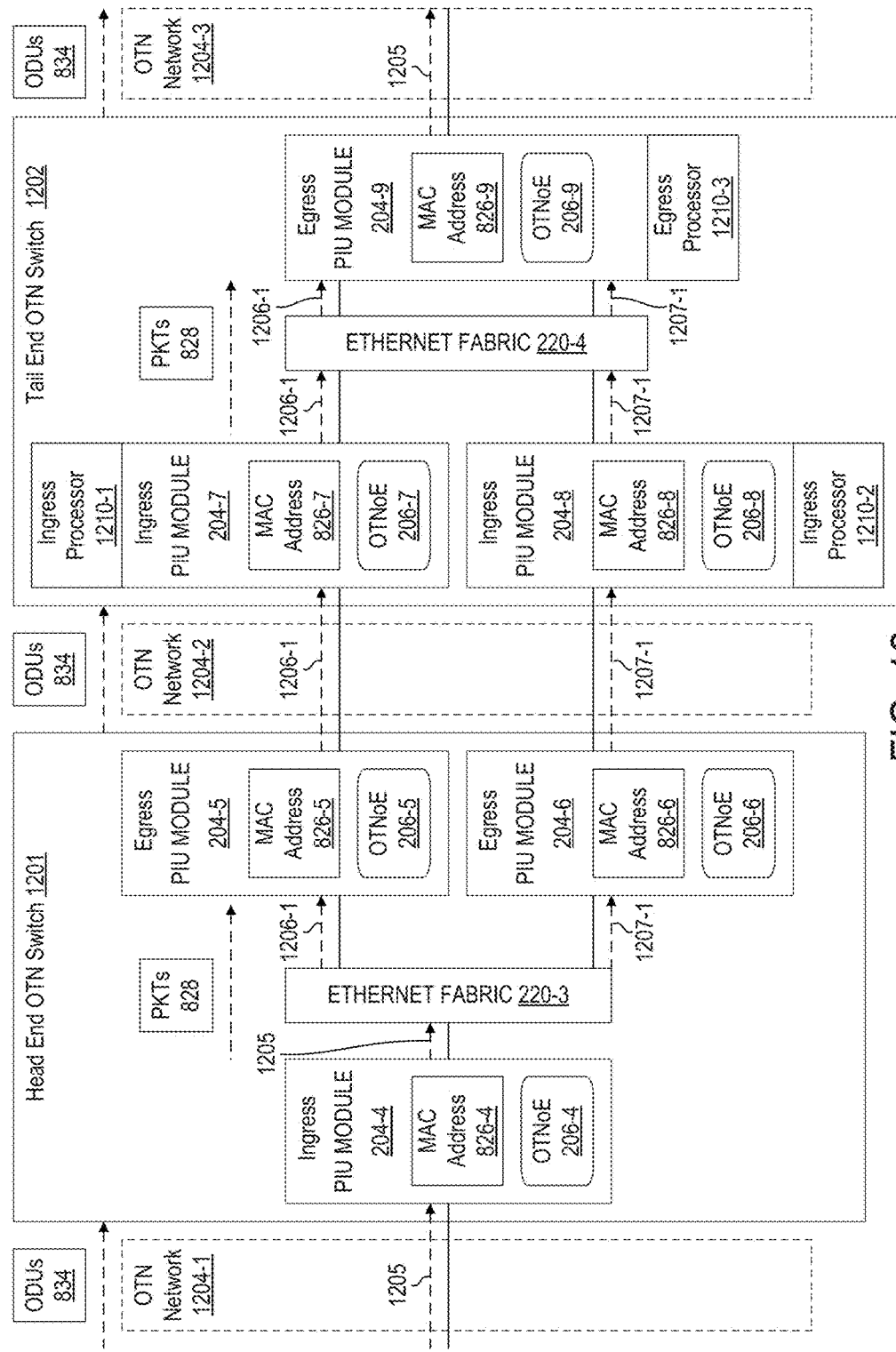
FIG. 12 is a block diagram of an example of ODU path protection in an embodiment of an OTN switching system.

Referring now to FIG. 12, a block diagram of an example of ODU path protection in an embodiment of an OTN switching system 1200 is illustrated. In FIG. 12, OTN switching system 1200 is shown in a schematic representation and is not drawn to scale or perspective. It is noted that, in different embodiments, OTN switching system 1200 may be operated with additional or fewer elements.

In OTN switching system 1200, one or more ODU paths 1205 may be established for transmission of ODUs. One or more working ODU paths 1206 may also be established for transmission of ODUs and one or more protection ODU paths 1207 may be established for sub-network connection protection (SNCP) which is a per path protection mechanism for working ODU paths 1206 using protection ODU paths 1207. The working ODU paths 1206 may include a working ODU path 1206-1 that extends from a head end OTN switch 1201 to an OTN network 1204-2, and from OTN network 1204-2 to a tail end OTN switch 1202. Working ODU path 1206-1 may further be established from Ethernet fabric 220-3 to an egress PIU module 204-5, from egress PIU module 204-5 to an ingress PIU module 204-7 via OTN network 1204-2, from ingress PIU module 204-7 to an Ethernet fabric 202-4, and from Ethernet fabric 220-4 to an egress PIU module 204-9. Multiple protection ODU paths 1207 including a protection ODU path 1207-1 may be established for SNCP. Protection ODU path 1207-1 may be established from Ethernet fabric 220-3 to an egress PIU module 204-6, from egress PIU module 204-6 to an ingress PIU module 204-8 via OTN network 1204-2, from ingress PIU module 204-8 to Ethernet fabric 202-4, and from Ethernet fabric 220-4 to egress PIU module 204-9. Protection ODU path 1207-1 protects working ODU path 1206-1 in case OTN switch 1202 detects at least one of: a fault condition associated with working ODU path 1206-1; an OTN command to perform a protection switch; a cessation of ODU transmission over working ODU path 1206-1; an impairment of ODU transmission over working ODU path 1206-1, among other conditions.

In OTN switching system 1200, head end OTN switch 1201 may be connected to ODU path 1205, working ODU path 1206-1, and protection ODU path 1207-1. Tail end OTN switch 1202 may also be connected to ODU path 1205, working ODU path 1206-1, and protection ODU path 1207-1. Ingress PIU module 204-4 may be connected to ODU path 1205 and Ethernet fabric 220-3, Egress PIU modules 204-5 and 204-6 may be connected to working ODU path 1206-1, protection ODU path 1207-1, and Ethernet fabric 220-3. Ingress PIU modules 204-7 and 204-8 may be connected to working ODU path 1206-1, protection ODU path 1207-1, and Ethernet fabric 220-4, and Egress PIU module 204-9 may be connected to working ODU path 1206-1, protection ODU path 1207-1, Ethernet fabric 220-4, and ODU path 1205. Until a protection switch is performed, egress PIU module 204-5 and ingress PIU module 204-7 may operate in a working state, and egress PIU module 204-6 and ingress PIU module 204-8 may operate in a protection state, described in further detail below.

During uni-directional SNCP switching operation of head end OTN switch 1201, ingress PIU module 204-4 may receive in sequence ODUs 834 from OTN network 1204-1 via ODU path 1205. Ingress PIU module 204-4 may utilize a multicast media access control (MAC) address to transmit Ethernet packets 828 corresponding to the in sequence ODUs 834 to both egress PIU module 204-5 and egress PIU module 204-6 via Ethernet fabric 220-3. The transmission of Ethernet packets 828 from ingress PIU module 204-4 to Ethernet fabric 220-3 is depicted by ODU path 1205. The reception of Ethernet packets 828 at egress PIU module 204-5 is depicted by working ODU path 1206-1. The reception of Ethernet packets 828 at egress PIU module 204-6 is depicted by protection ODU path 1207-1.

their arrival at egress PIU module 204-5, and ODU path 1207-1 representing the arrival of the same Ethernet packets 828 at egress PIU module 204-6.

A multicast MAC address may be assigned and managed for each pair of egress PIU modules 204, e.g. egress PIU modules 204-5 and 204-6, where a first portion of the multicast MAC address may be assigned the virtual slot address associated with the corresponding Ethernet switch ports 1116 of Ethernet switches 212 of Ethernet fabric 220-3 that are connected to egress PIU module 204-5, previously described (see FIG. 11). A second portion of the multicast MAC address may be assigned the virtual slot address associated with the corresponding Ethernet switch ports 1116 of Ethernet switches 212 of Ethernet fabric 220-3 that are connected to egress PIU module 204-6, described above (see FIG. 11). In an embodiment, the higher virtual slot number of egress PIU modules 204 is assigned to the lower eleven bits of the multicast MAC address and the lower virtual slot number is assigned to the higher eleven bits of the multicast MAC address. While the 22 bit space represent a four million multicast MAC address space, the actual multicast MAC address space used may be smaller, because the actual number of egress PIU module pairs 204 that serve as egress PIU modules for 1+1 bridges may be fairly small in practice and involves only a small set of coherent egress PIU module pairs. Because the actual multicast MAC address space may be small, the size of an Ethernet fabric MAC address table may be small and may enable fast access to Ethernet fabric MAC address table entries of the Ethernet fabric MAC address table. The management of an Ethernet fabric MAC address table by an OTN switch network element controller 214 (see FIG. 2) may also be more efficient by utilizing simpler data structures, e.g. a linked list of Ethernet fabric MAC address table entries. The smaller size of the Ethernet fabric MAC address table and the utilization of the simpler data structures may also allow for the more efficient addition or removal of a Ethernet fabric MAC address table entries when a protection group is set up or torn down. A multicast MAC address may be provisioned when a bridge, for example, Ethernet fabric 220-3, indicates creation of the multicast MAC address for transmissions to more than one egress PIU module 204. Once the multicast MAC address is created, all bridges that use the same pair of egress PIU modules 204 may share the same multicast MAC address.

In another embodiment, a multicast MAC address may be assigned and managed for each working ODU path 1206 and each protection path 1207 that may utilize a bridge. An eight million multicast MAC address space is large enough to assign each working ODU path and protection path 1207 a unique multicast MAC address in OTN switching system 1200 and to assign multicast MAC addresses that may help avoid any well-known multicast MAC addresses. In this embodiment, because the multicast MAC address space is large, the size of the Ethernet fabric MAC address table may be large and OTN switch network element controller 214 may utilize more complex data structures to enable more efficient access of the Ethernet fabric MAC address table.

Upon arrival of Ethernet packets 828, egress PIU module 204-5 converts Ethernet packets 828 to corresponding in sequence ODUs 834 and transmits them to ingress PIU module 204-7 via OTN network 1204-2, depicted by working ODU path 1206-1. Upon arrival of the same Ethernet packets 828, egress PIU module 204-6 converts Ethernet packets 828 to the same corresponding in sequence ODUs 834 and transmits them to ingress PIU module 204-8 via OTN network 1204-2, depicted by protection ODU path 1207-1.

Tail end OTN switch 1202 may include an ingress processor 1210-1 associated with ingress PIU module 204-7, an ingress processor 1210-2 associated with ingress PIU module 204-8, and an egress processor 1210-3 associated with egress PIU module 204-9. Ingress PIU module 204-7 may include ingress processor 1210-1, ingress PIU module 204-8 may include ingress processor 1210-2, and egress PIU module 204-9 may include egress processor 1210-3. In one or more embodiments, ingress processor 1210-1 may be included in a same PIU blade chassis 202 (see FIG. 2) as ingress PIU module 204-7, ingress processor 1210-2 may be included in a same PIU blade chassis 202 as ingress PIU module 204-8, and egress processor 1210-3 may be included in a same PIU blade chassis 202 as egress PIU module 204-9.

During uni-directional SNCP switching operation of tail end OTN switch 1202, ingress processor 1210-1 may monitor working ODU path 1206-1 to detect at least one of: a fault condition associated with working ODU path 1206-1; an OTN command to perform a protection switch; a cessation of ODU transmission over working ODU path 1206-1; an impairment of ODU transmission over working ODU path 1206-1, among other conditions. Ingress processor 1210-1 may analyze a detected condition to determine the status of working ODU path 1206-1. Ingress processor 1210-2 may monitor protection ODU path 1207-1 to detect at least one of: a fault condition associated with protection ODU path 1207-1; an OTN command to perform the protection switch; an impairment of ODU transmission over protection ODU path 1207-1; and an expiration of a keep alive delay timer associated with protection ODU path 1207-1. Ingress processor 1210-2 may analyze a detected condition to determine the status of protection ODU path 1207-1. Ingress processors 1210-1 and 1210-2 may communicate the respective status of working ODU path 1206-1 and protection ODU path 1207-1 to each other and egress processor 1210-3. Ingress processors 1210-1 and 1210-2, and egress processor 1210-3 may also communicate various commands between them. In one or more other embodiments, ingress PIU module 204-7 and ingress PIU module 204-8 may monitor respective working ODU path 1206-1 and protection ODU path 1207-1, and may communicate the respective status of working ODU path 1206-1 and protection ODU path 1207-1 to each other and egress PIU module 204-9. Ingress PIU module 204-7, ingress PIU module 204-8, and egress PIU module 204-9 may also communicate various commands between them.

Upon arrival of in sequence ODUs 834 at ingress PIU module 204-7, operating in the working state, ingress PIU module 204-7 converts ODUs 834 to corresponding Ethernet packets 828 including the status of working ODU path 1206-1. Ingress PIU module 204-7 transmits Ethernet packets 828 to egress PIU module 204-9 via Ethernet fabric 220-4, depicted by working ODU path 1206-1. Upon arrival of Ethernet packets 828 at egress PIU module 204-9, Ethernet packets 828 may be stored at one of re-sequencing buffers 870 (see FIG. 10) of egress PIU module 204-9 for further processing. Egress PIU module 204-9 may utilize the status in Ethernet packets 828 to monitor the state of working ODU path 1206-1, described in further detail below.

A keep alive Ethernet packet having a keep alive sequence number associated with a protection ODU path 1207 may be transmitted periodically, e.g. every N milliseconds, to report the state of the protection ODU path 1207 and any commands and administrative actions on the protection ODU path 1207. When the status of a protection ODU path 1207 changes, a keep alive Ethernet packet may be transmitted immediately. In other cases, several keep alive messages may be bundled into a single keep alive Ethernet packet to reduce the number of transmissions of keep alive Ethernet packets. An ingress PIU module 204 may transmit keep alive Ethernet packet T consecutive times with the same keep alive sequence number associated with the protection ODU path 1207 which may prevent Ethernet packet loss, where T is greater than or equal to 1. The transmission of the keep alive Ethernet packets may reduce Ethernet fabric 220-4 communication traffic. The keep alive sequence number associated with the protection ODU path 1207 may be incremented at the next time period the keep alive Ethernet packet is transmitted, where the starting value of the keep alive sequence number associated with the protection ODU path 1207 may be a random number. The use of keep alive sequence numbers may help minimize stall messages in the OTN switching system 1200. Egress PIU module 204-9 may utilize the status of protection ODU path 1207-1 in the keep alive Ethernet packets to monitor the state of protection ODU path 1207-1, described in further detail below.

Ingress PIU modules 204-7 and 204-8 each have an associated hold off delay associated with respective working ODU path 1206-1 and protection ODU path 1207-1 that may be managed by respective ingress PIU modules 204-7 and 204-8. Each hold off delay may be utilized as part of the state of respective working ODU path 1206-1 and protection ODU path 1207-1. In one or more other embodiments, each hold off delay may be managed by respective working ingress processor 1210-1 and protection processor 1210-2. In one or more other embodiments, a hold off delay may be implemented using a timer, a delay device, or another mechanism.

Each protection ODU path 1207 may have an associated keep alive delay that may be managed by an egress PIU module 204, where each keep alive delay may be reset each time the egress PIU module 204 receives a keep alive Ethernet packet associated with a respective protection ODU path 1207. For example, egress PIU module 204-9 may reset the keep alive delay associated with protection ODU path 1207-1 upon receiving a keep alive Ethernet packet associated with protection ODU path 1207-1 indicating that a condition has not been detected on protection ODU path 1207-1. In one or more other embodiments, a keep alive delay may be implemented using a timer, a delay device, or another mechanism.

Upon arrival of the same in sequence ODUs 834 at ingress PIU module 204-8, operating in the protection state, ingress PIU module 204-8 utilizes protection ODU path 1207-1 to transmit the status of protection ODU path 1207-1 in the keep alive Ethernet packets having a keep alive sequence number associated with protection ODU path 1207-1 to egress PIU module 204-9 via Ethernet fabric 220-4 using protection ODU path 1207-1. Ingress PIU module 204-8, operating in the protection state, may transmit the keep alive Ethernet packets instead of transmitting Ethernet packets 828 corresponding to the same in sequence ODUs 834.

In one or more other embodiments, ingress PIU module 204-8, operating in the protection state, may convert the ODUs 834 to corresponding Ethernet packets 828 including the status of protection ODU path 1207-1 and may transmit Ethernet packets 828 to egress PIU module 204-9 via protection ODU path 1207-1. Transmitting the same Ethernet packets 828 to egress PIU module 204-9 may improve protection switching performance, though additional Ethernet fabric hardware for transmission of both the working ODU path traffic and the protection ODU path traffic may be needed to meet the Ethernet fabric bandwidth and frequency goals. In other embodiments, egress PIU module 204-9 may receive the same Ethernet packets 828 over protection ODU path 1207-1 that may further facilitate faster protection switching performance although egress PIU module 204-9 may need additional re-sequencing buffers 870 (see FIG. 10) to store the same Ethernet packets 828 from ingress PIU module 204-7. In certain applications, a trade-off between faster protection switching performance and additional Ethernet fabric hardware, e.g. additional re-sequencing buffers 870, may be evaluated to determine a desired operation of OTN switch 1202.

During uni-directional SNCP switching operation of tail end OTN switch 1202, an event or condition may be detected at one or more of ingress PIU module 204-7 and ingress PIU module 204-8. An event or a condition may be at least one of: a fault condition associated with a working ODU path 1206, a fault condition associated with a protection ODU path 1207, an OTN command to perform a protection switch, a cessation of ODU transmission over a working ODU path 1206, an impairment of ODU transmission over a working ODU path 1206, an expiration of a hold off delay associated with a respective working ODU path 1206 or protection ODU path 1207, among other events or conditions. Each event or condition may have an associated priority that indicates the priority of the event or condition relative to the priorities of the other events or conditions. For example, a particular fault condition associated with a particular working ODU path 1206 may have a priority that is higher than another particular fault condition associated with another particular protection ODU path 1207. For another example, a particular OTN command to perform a protection switch may have a higher priority than a particular fault condition associated with a particular protection ODU path 1207. Ingress processor 1210-1 may determine the status of the working ODU path 1206 based on the particular event or condition detected. When the event or condition is detected at ingress PIU module 204-7, operating in the working state, ingress PIU module 204-7 sets the status of the working ODU path 1206 of Ethernet packets 828 to indicate the event or condition prior to Ethernet packets 828 being transmitted to egress PIU module 204-9. Ingress processor 1210-2 may determine the status of the protection ODU path 1207 based on the event or condition detected. When the event or condition is detected at ingress PIU module 204-8, operating in the protection state, ingress PIU module 204-8 transmits a keep alive Ethernet packet having the status of the protection ODU path 1207 set to indicate that the event or condition was detected at ingress PIU module 204-8.

Upon arrival of one or more of Ethernet packets 828 having the status of working ODU path 1206-1 and a keep alive Ethernet packet having the status of protection ODU path 1207-1, egress PIU module 204-9 may determine that a protection switch is to be performed on working ODU path 1206-1 using protection ODU path 1207-1. The determination that the protection switch may be performed may include egress PIU module 204-9 determining that: an event or condition is detected at ingress PIU module 204-7, or an event or condition is detected at ingress PIU module 204-8. The determination that the protection switch may be performed may further include egress PIU module 204-9 determining that: a priority of a particular working ODU path 1206-1 is higher than a priority of a particular protection ODU path 1207-1.

In response to the determination, egress PIU module 204-9 performs the protection switch to begin receiving Ethernet packets 828 from ingress PIU module 204-8 via protection ODU path 1207-1 and keep alive Ethernet packets from ingress PIU module 204-7 via working ODU path 1206-1, as explained in further detail below. In one or more other embodiments, egress processor 1210-3, performs the protection switch for egress PIU module 204-9 to begin receiving Ethernet packets 828 from ingress PIU module 204-8 via protection ODU path 1207-1 and the corresponding Ethernet packets 828 from ingress PIU module 204-7 via working ODU path 1206-1.

Egress PIU module 204-9, as part of the protection switch, may transmit one or more stop ODU transmission messages having an assigned stop ODU transmission sequence number associated with working ODU path 1206-1 to ingress PIU module 204-7. Egress PIU module 204-9 may also transmit one or more start ODU transmission messages having an assigned start ODU transmission sequence number associated with protection ODU path 1207-1 to ingress PIU module 204-8. Egress PIU module 204-9 may further drain Ethernet packets 828 received over working ODU path 1206-1 from the respective re-sequencing buffer 870 associated with egress PIU module 204-9. Egress PIU module 204-9 may also fill the respective re-sequencing buffer 870 associated with egress PIU module 204-9 with Ethernet packets 828 received over protection ODU path 1207-1. Egress PIU module 204-9 may also re-establish clock synchronization with protection ODU path 1207-1. Egress PIU module 204-9 may drain the respective re-sequencing buffer 870 by flushing the re-sequencing buffer 870 and discarding any Ethernet packets 828 received from working ODU path 1206-1.

Each of the stop and start ODU transmission messages may be sent a number T consecutive times to minimize Ethernet packet loss, where the value of T is greater than or equal to 1. In an embodiment, T is set to 3. In one or more other embodiments, the value of T may be set during a configuration of tail end OTN switch 1202, a system boot up, or the like. Ingress PIU module 204-7, in response to receiving the one or more stop ODU transmission messages, starts operating in the protection state and transmits keep alive Ethernet packets over working ODU path 1206-1. Ingress PIU module 204-8, in response to receiving the one or more start ODU transmission messages, starts operating in the working state and transmits Ethernet packets 828 over protection ODU path 1206-3.

Operating OTN switching system 1200 in this manner, provides sub-network connection protection (SNCP) of working ODU paths 1206. Tail end OTN switch 1202 may protect a working ODU path 1206 by establishing a redundant protection ODU path 1207 to protect the working ODU path 1206. Tail end OTN switch 1202 may detect an event or condition associated with the working ODU path 1206 and may determine that a protection switch may be performed on the working ODU path 1206 based on the detection of the event or condition. In response to the determination, tail end OTN switch 1202 performs the protection switch using the using the protection ODU path 1207, which provides 1+1 OTN protection.

Figure 13:
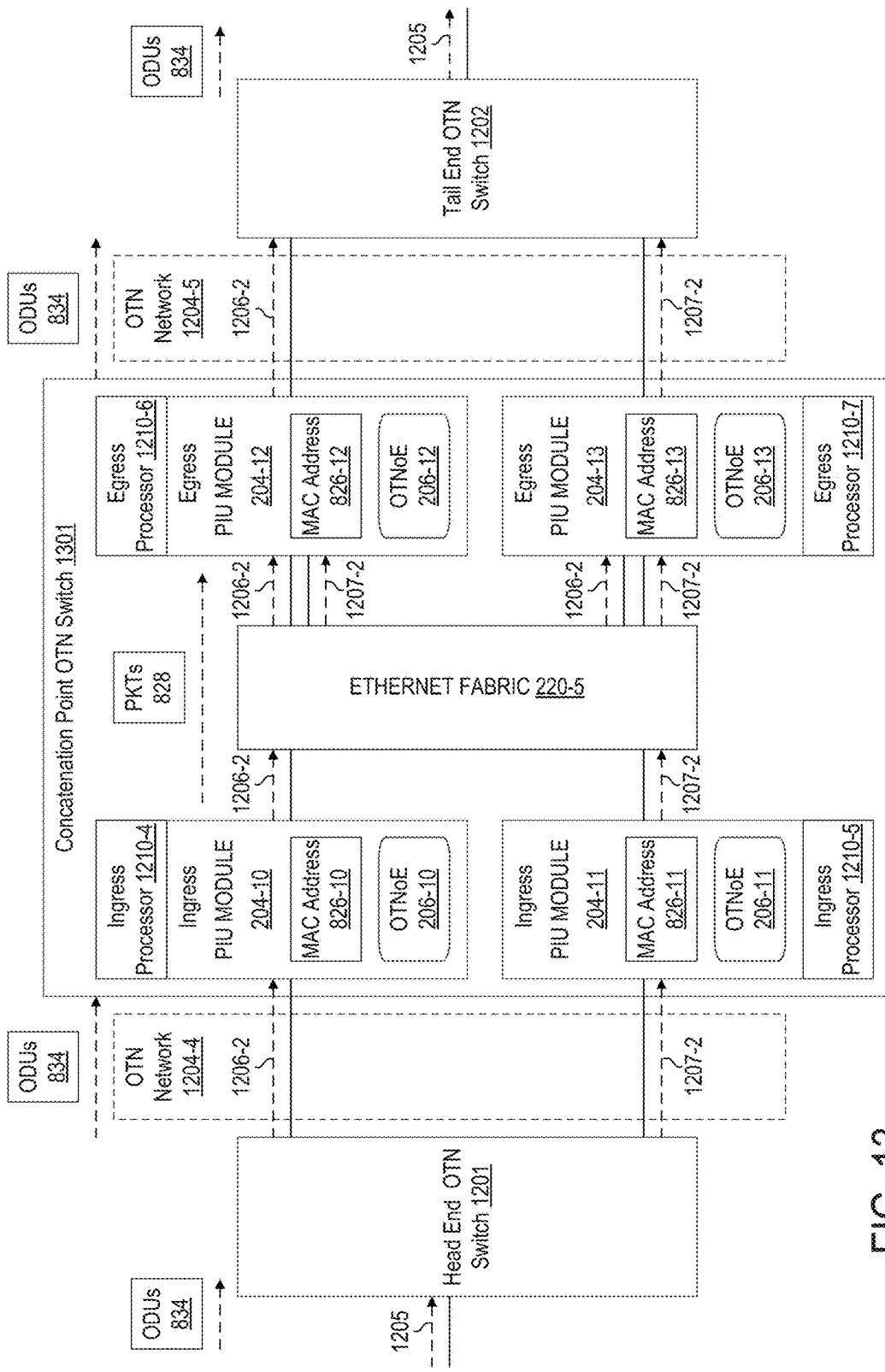
FIG. 13 is a block diagram of an example of concatenation of ODU path protection in an embodiment of an OTN switching system.

Referring now to FIG. 13, a block diagram of an example of concatenation of ODU path protection in an embodiment of an OTN switching system 1300 is illustrated. In FIG. 13, OTN switching system 1300 is shown in a schematic representation and is not drawn to scale or perspective. It is noted that, in different embodiments, OTN switching system 1300 may be operated with additional or fewer elements.

In OTN switching system 1300, head end OTN switch 1201 and tail end OTN switch 1202 operate as previously described with reference to FIG. 12. In OTN switching system 1300 shown in FIG. 13, a concatenation point OTN switch 1301 has been added in between head end OTN switch 1201 and tail end OTN switch 1202. Concatenation point OTN switch 1301 operates similar to the operation of tail end OTN switch 1202 but may also prevent a failure in the OTN network 1204-4 SNCP domain from causing sympathetic protection switching in the OTN network 1204-5 SNCP domain while in subnetwork connection with non-intrusive end-to-end monitoring (SNC/Ne). A sympathetic protection switch is a protection switch caused by failure propagation into the intended protection domain, e.g. OTN network 1204-5 SNCP domain, from outside the intended protection domain, e.g. the OTN network 1204-4 domain. The hold off delays in the OTN network 1204-5 SNCP domain may be configured to have longer hold off delay expiration values than the hold off delay expiration values described above with reference to FIG. 12. As shown, 1+1 SNCP protection for concatenation point OTN switch 1301 is similar to the 1+1 protection for tail end OTN switch 1202.

In concatenation point OTN switch 1301, a single multicast MAC address may be utilized as in the 1+1 protection for OTN switching system 1200 of FIG. 12. Working ODU path 1206-2 and protection ODU path 1207-2 may utilize the single multicast MAC address, where ingress PIU module 204-10, operating in the working state, uses the single multicast MAC address to transmit Ethernet packets 828 to both egress PIU modules 204-12 and 204-13. Ingress PIU module 204-11, operating in the protection state, may refrain from transmitting the corresponding Ethernet packets 828 to Ethernet fabric 220-5, for example to reduce traffic and increase performance of Ethernet fabric 220-5.

In FIG. 13, the protection switch may be initiated, in one embodiment, by egress PIU module 204-12 on working ODU path 1206-2. Concatenation point OTN switch 1301 may perform the protection switch for: egress PIU module 204-12 to receive Ethernet packets 828 from ingress PIU module 204-11 via protection ODU path 1207-2 and egress PIU module 204-13 to receive the corresponding Ethernet packets 828 from ingress PIU module 204-11 via protection ODU path 1207-2.

In FIG. 13, the protection switch may be initiated, in some embodiments, by egress PIU module 204-12 on working ODU path 1206-2. The communication between egress PIU module 204-12 and ingress PIU modules 204-10 and 204-11 is the same as in 1+1 SNCP protection switching previously described with reference to FIG. 12, with an additional communication between egress PIU module 204-12 and egress PIU module 204-13. In one or more other embodiments, the protection switch may be initiated by egress processor 1210-6, and egress processor 1210-6, ingress processor 1210-4, ingress processor 1210-5, and egress processor 1210-7 may communicate status, various OTN commands, and other information and data between each other. Egress processor 1210-7 may periodically monitor egress processor 1210-6 for an indication that egress processor 1210-6 has a fault condition. Egress processor 1210-7, in response to the indication that egress processor 1210-6 has the fault condition, will take over the monitoring and protection switch initiation function from egress processor 1210-6. In one or more other embodiments, egress PIU module 204-13 may similarly periodically monitor egress PIU module 204-12 for an indication that egress PIU module 204-12 has a fault condition. Egress PIU module 204-13, in response to the indication that egress PIU module 204-12 has the fault condition, will take over the monitoring and protection switch initiation function from PIU module 204-12.

Figure 14:
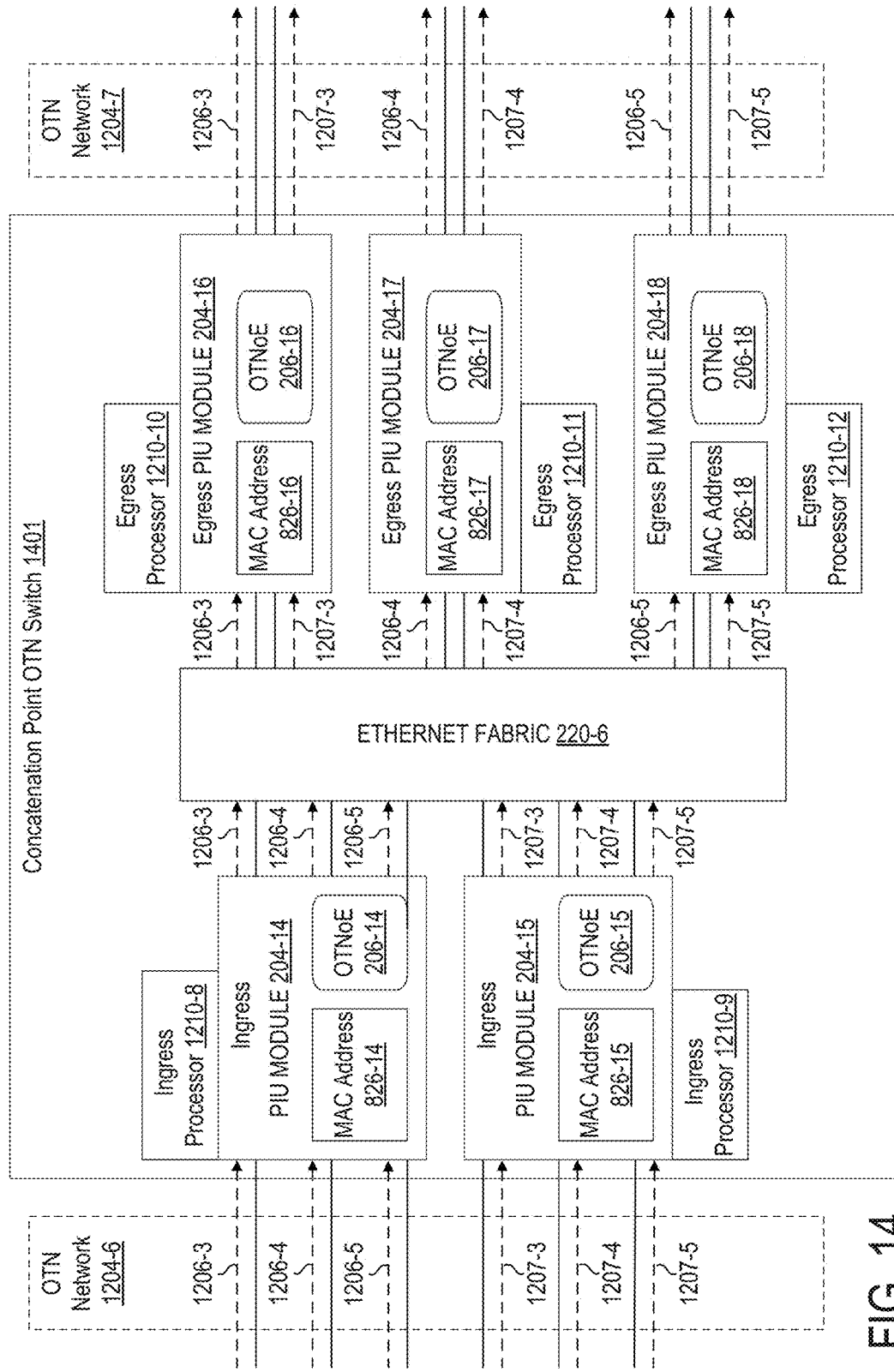
FIG. 14 is a block diagram of an example embodiment of an OTN switching system.

Referring now to FIG. 14, a block diagram of an example embodiment of an OTN switching system 1400 is illustrated. In FIG. 14, OTN switching system 1400 is shown in a schematic representation and is not drawn to scale or perspective. It is noted that, in different embodiments, OTN switching system 1400 may be operated with additional or fewer elements. In OTN switching system 1400, subnetwork connection protection with inherent monitoring (SNC/I) on high order ODU may be used to support OTU-link layer protection, which may be utilized for inter-domain protected hand-offs.

During operation of concatenation point OTN switch 1401, ingress PIU module 204-14, operating in the working state, may transmit Ethernet packets 828 associated with working ODU path 1206-3 to egress PIU module 204-16. Ingress PIU module 204-14 may also transmit Ethernet packets 828 associated with working ODU path 1206-4 to egress PIU module 204-17. Ingress PIU module 204-14 may further transmit Ethernet packets 828 associated with working ODU path 1206-5 to egress PIU module 204-18, via Ethernet fabric 220-6. Ingress PIU module 204-15, operating in the protection state, may refrain from transmitting the corresponding Ethernet packets 828 associated with ODU path 1207-3, ODU path 1207-4, and ODU path 1206-5.

During operation of concatenation point OTN switch 1401, at least one of ingress PIU module 204-14, operating in the working state, and ingress PIU module 204-15, operating in the protection state, may determine that a protection switch may be performed. In response to the determination, egress PIU modules 204-16, 204-17, and 204-18 may be informed. The communication between ingress PIU modules 204-14 and 204-15, and egress PIU modules 204-16, 204-17, and 204-18 is similar to the communication described above with reference to FIG. 12 and FIG. 13. In one or more other embodiments, two or more ingress PIU modules 204 may determine that a protection switch may be performed. In response to the determination, two or more egress PIU modules 204 may be informed. In one or more other embodiments, ingress processors 1210-8 and 1210-9 may determine that a protection switch may be performed, and ingress processors 1210-8 and 1210-9, and egress processors 1210-10, 1210-11, and 1210-12 may communicate status, various OTN commands, and other information and data between each other. Concatenation point OTN switch 1401 may perform the protection switch for egress PIU module 204-16 to receive Ethernet packets 828 associated with protection ODU path 1207-3 from ingress PIU module 204-15, via Ethernet fabric 220-6. In addition, egress PIU module 204-17 may receive Ethernet packets 828 associated with protection ODU path 1207-4 from ingress PIU module 204-15, via Ethernet fabric 220-6. Further, egress PIU module 204-18 may receive Ethernet packets 828 associated with protection ODU path 1207-5 from ingress PIU module 204-15, via Ethernet fabric 220-6.

Figure 15:
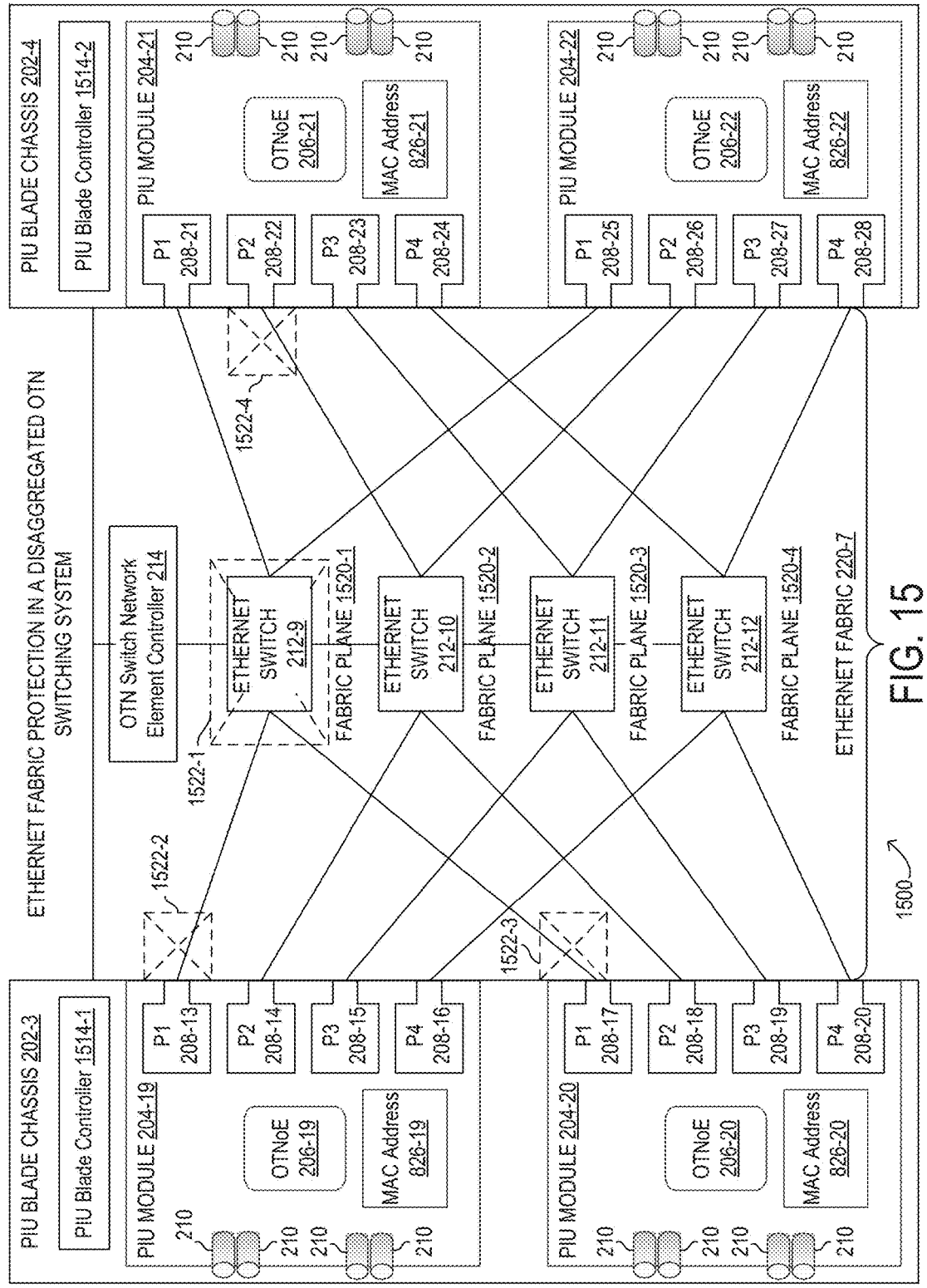
FIG. 15 is a block diagram of an example of Ethernet fabric protection in an embodiment of an OTN switching system.

Referring now to FIG. 15, a block diagram of an example of Ethernet fabric protection in an embodiment of an OTN switching system 1500 is illustrated. In FIG. 15, OTN switching system 1500 is shown in a schematic representation and is not drawn to scale or perspective. It is noted that, in different embodiments, OTN switching system 1500 may be operated with additional or fewer elements.

In FIG. 15, a PIU module 204 of a plurality of PIU modules 204 may detect a fault condition 1522 on an Ethernet fabric plane 1520 of an Ethernet fabric 220-7. In response to the detection, OTN switching system 1500 may transmit the fault condition 1522 to other PIU modules 204 of the plurality of PIU modules 204 to redirect ODU traffic away from the fault on the Ethernet fabric plane 1520. By redirecting the ODU traffic away from the fault, OTN switching system 1500 protects the Ethernet fabric 220-7, which allows for continuous transmission of the ODU traffic.

In OTN switching system 1500, a particular PIU module 204 may detect at least one of: a fault condition 1522 associated with a failure of one of the Ethernet fabric planes 1520, a fault condition 1522 associated with an administrative action to shut down one of the Ethernet fabric planes 1520, a fault condition 1522 associated with a failure of one of PIU ports 208 of the particular PIU module 204, a fault condition 1522 associated with a failure of a connection between one of PIU ports 208 of the particular PIU module 204 and a corresponding Ethernet switch 212, among other fault conditions 1522. OTN switching system 1500 may have the capability to provide sufficient bandwidth to allow for continuous transmission of the ODU traffic in the case of: one or more Ethernet fabric planes 1520 fails or is shutdown; one or more PIU ports 208 of corresponding PIU modules 204 fails, one or more connections to corresponding one or more PIU ports 208 of corresponding PIU modules 204 fail, among other failures. For example, OTN switching system 1500 provides 1:3 Ethernet fabric protection when one of the Ethernet fabric planes 1520 of Ethernet fabric 220-7 fails.

During operation of OTN switching system 1500, a failure of an Ethernet fabric plane 1520-1 of an Ethernet switch 212-9 may occur. That failure may or may not be immediately detected by the Ethernet switch 212-9 itself. However, it may be detected by its communication counterparts, which are PIUs 204. A PIU module 204-19 may detect a fault condition 1522-1 associated with the failure of Ethernet fabric plane 1520-1 by seeing its failure condition 1522-2. At this moment, PIU 204-19 and its associated blade controller 1514-1 may not always know if the failure is a localized link failure or a wider-ranging failure on Ethernet switch 212-9. Before 1514-1 detects or receives any indication that there may be wider failure than a local link failure, it treats the failure as a local link failure by stopping ODU traffic forwarding towards the failed link but not the whole Ethernet forwarding plane. PIU module 204-19 may also stop transmission of ODU traffic via Ethernet fabric plane 1520-1, while continuing to transmit ODU traffics on the rest of the Ethernet fabric planes. PIU module 204-19 may further communicate fault condition 1522-1 to an associated PIU blade controller 1514-1 of PIU blade chassis 220-3. PIU blade controller 1514-1 may communicate fault condition 1522-1 to other associated PIU modules 204 so that the other associated PIU modules 204, e.g. PIU module 204-20, may stop transmission of ODU traffic to the PIU module 204 detecting the failure (in this case PIU module 204-19) via Ethernet fabric plane 1520-1, while continuing to transmit ODU traffics to PIU module 204-19 on the rest of the Ethernet fabric planes. PIU module 204-20 (before detecting its own link failure 1522-3 in this specific example of FIG. 15) may continue to transport other ODU traffic over all Ethernet fabric planes, including 1520-1. A failure message having a sequence number associated with fault condition 1522-1 may be transmitted immediately to report fault condition 1522-1 to other PIU blade controllers 1514 associated with other PIU modules 204 using any one of the other Ethernet fabric planes 1520-2 through 1520-4. The failure message may be transmitted as a MAC broadcast real-time control message. PIU blade controller 1514-1 may transmit the failure message T consecutive times with the same sequence number associated with fault condition 1522-1, where T is greater than or equal to 1. PIU blade controller 1514-1 may transmit the failure message using a cyclical walk sequence 944 (see FIG. 9), previously described. PIU blade controller 1514-1 transmitting the failure message to the other PIU blade controllers 1514 may reduce the number of MAC broadcast real-time control messages. In one or more other embodiments, PIU module 204-19 may transmit the failure message associated with fault condition 1522-1 to report fault condition 1522-1 to the other PIU modules 204.

Upon receiving the failure message associated with fault condition 1522-1, the other PIU blade controllers 1514 may communicate fault condition 1522-1 to the other associated PIU modules 204 so that the other associated PIU modules 204 may stop transmission of ODU traffic to the PIU module that detected the fault (PIU module 204-19) via Ethernet fabric plane 1520-1, while continuing to transmit ODU traffics on the rest of the Ethernet fabric planes. As illustrated in FIG. 15, upon receiving the failure message associated with fault condition 1522-1, PIU blade controller 1514-2 may communicate fault condition 1522-1 to PIU module 204-21 and PIU module 204-22 so that PIU module 204-21 and PIU module 204-22 may stop their transmission of ODU traffic to PIU module 204-19 via Ethernet fabric plane 1520-1, while continuing to transmit ODU traffics on the rest of the Ethernet fabric planes.

In one or more other embodiments, during operation of OTN switching system 1500, fault condition 1522-2 associated with the failure of the ith PIU port 208-13 of corresponding PIU module 204-19 on the ith Ethernet fabric plane 1520-1 and a second fault condition 1522-3 associated with a failure of an ith PIU port 208-17 of corresponding PIU module 204-20 on the ith Ethernet fabric plane 1520-1 may occur. The fault condition 1522-2 and the second fault condition 1522-3 occur at substantially the same time. PIU module 204-19 may detect the fault condition 1522-2 and may stop transmission of its respective ODU traffic via its ith PIU port 208-13. PIU module 204-19 may also communicate the fault condition 1522-2 to PIU blade controller 1514-1. PIU module 204-20 may detect the second fault condition 1522-3 and may stop transmission of its respective ODU traffic via its ith PIU port 208-17. PIU module 204-20 may also communicate the second fault condition 1522-3 to PIU blade controller 1514-1. At this moment, PIU blade controller 1514-1 understands the failure is beyond a local link failure 1522-2 originally detected PIU 204-19. Now PIU blade controller 1514-1 may instruct its PIU modules 204 not to use the Ethernet fabric plane 1520-1 for any ODU transmission. PIU blade controller 1514-1 may communicate fault condition 1522-2 to PIU module 204-20 so that PIU module 204-20 may stop transmission of its respective ODU traffic to the ith PIU port 208-13 of corresponding PIU module 204-19. PIU blade controller 1514-1 may also communicate fault condition 1522-3 to PIU module 204-19 so that PIU module 204-19 may stop transmission of its respective ODU traffic to the ith PIU port 208-17 of corresponding PIU module 204-20. As previously described, a MAC broadcast failure message associated with the fault condition 1522-2 and the second fault condition 1522-3 may be similarly transmitted immediately to report the fault condition 1522-2 and the second fault condition 1522-3 to PIU blade controller 1514-2 associated with PIU modules 204-21 and 204-22 using any one of Ethernet fabric planes 1520-2 through 1520-4.

Upon receiving the failure message associated with the fault condition 1522-2 and the second fault condition 1522-3, PIU blade controller 1514-2 also understands it is more than a local link failure and therefore may stop transmitting ODU traffic over Ethernet fabric plane 1520-1. PIU blade controller 1514-2 may communicate the fault condition 1522-2 and the second fault condition 1522-3 to PIU modules 204-21 and 204-22 so that PIU modules 204-21 and 204-22 may stop transmission of their respective ODU traffic to the ith PIU port 208-13 of corresponding PIU module 204-19 and the ith PIU port 208-17 of corresponding PIU module 204-20 on the ith Ethernet fabric plane 1520-1. Handling the occurrence of the fault condition 1522-2 and the second fault condition 1522-3 in this manner may allow for a simpler mechanism to provide Ethernet fabric protection.

In one or more other embodiments, during operation of OTN switching system 1500, the fault condition 1522-2 associated with the failure of the ith PIU port 208-13 of corresponding PIU module 204-19 on the ith Ethernet fabric plane 1520-1 and the second fault condition 1522-3 associated with the failure of the ith PIU port 208-17 of corresponding PIU module 204-20 on the ith Ethernet fabric plane 1520-1 may occur. The fault condition 1522-2 and the second fault condition 1522-3 occur at substantially the same time. PIU module 204-19 may detect the fault condition 1522-2 and may communicate the fault condition 1522-2 to PIU blade controller 1514-1. PIU module 204-20 may detect the second fault condition 1522-3 and may communicate the second fault condition 1522-3 to PIU blade controller 1514-1. PIU blade controller 1514-1 may communicate fault condition 1522-2 to PIU module 204-20 so that PIU module 204-20 may stop transmission of its respective ODU traffic via all its PIU ports 208-17 through 208-20. PIU blade controller 1514-1 may also communicate fault condition 1522-3 to PIU module 204-19 so that PIU module 204-19 may stop transmission of its respective ODU traffic via all its PIU ports 208-13 through 208-16. PIU blade controller 1514-1 may further create a MAC broadcast failure message associated with the fault condition 1522-2 and the second fault condition 1522-3.

PIU blade controller 1514-1 may start a delay associated with PIU module 204-19 and PIU module 204-20. In an embodiment, the delay may be set to a random number between 0 and N. For example, N may be set to 100 micro seconds. In the case that the delay has expired without PIU blade controller 1514-1 receiving any failure messages from any other PIU blade controller 1514, e.g. PIU blade controller 1514-2, PIU blade controller 1514-1 may transmit a first MAC broadcast failure message associated with the fault condition 1522-2 and the second fault condition 1522-3 immediately to report the fault condition 1522-2 and the second fault condition 1522-3 to PIU blade controller 1514-2 associated with PIU modules 204-21 and 204-22 PIU blade controller 1514-2. After transmitting the first MAC broadcast message, PIU blade controller 1514-1 may start a second delay associated with PIU module 204-19 and PIU module 204-20. In an embodiment, the second delay may be set to a number equal to (2*N+M). For example, N may be set as above and M may be set to a value less than 1000 micro seconds.

After expiration of the second delay without PIU blade controller 1514-1 receiving any failure messages from PIU blade controller 1514-2, PIU blade controller 1514-1 is the only one detecting multiple ith PIU port 208 failures on the ith Ethernet fabric plane 1520-1. In this case, PIU blade controller 1514-1 may transmit a second MAC broadcast failure message associated with the fault condition 1522-2 and the second fault condition 1522-3 immediately to report the fault condition 1522-2 and the second fault condition 1522-3 to PIU blade controller 1514-2 associated with PIU modules 204-21 and 204-22. PIU blade controller 1514-1 may communicate to PIU module 204-19 and PIU module 204-20 so that PIU module 204-19 and PIU module 204-20 may start transmission of ODU traffic via all its non-failing PIU ports 208-14 through 208-16 and non-failing PIU ports 208-18 through 208-20 respectively.

A fault condition 1522-4 associated with the failure of the jth PIU port 208-22 of corresponding PIU module 204-21 on the jth Ethernet fabric plane 1520-2 has been detected by PIU module 204-21. In the case that PIU blade controller 1514-1 has received a third MAC broadcast failure message associated with the fault condition 1522-4 from PIU blade controller 1514-2 prior to the expiration of the second delay, PIU blade controller 1514-1 may create a PIU port status map that indicates which PIU ports 208 on the ith Ethernet fabric plane 1520-1 and on the jth Ethernet fabric plane 1520-2 have failed. After expiration of the second delay, PIU blade controller 1514-1 may start transmission of the respective ODU traffic from the M PIU ports 208-14 through 208-16 of PIU module 204-19, other than the ith PIU port 208-13 of PIU module 204-19, to the PIU modules 204-20, 204-21 and 204-22, other than the ith PIU port 208-17 of PIU module 204-20, and the jth PIU port 208-22 of PIU module 204-21. PIU blade controller 1514-1 may also start transmission of the respective ODU traffic from the M PIU ports 208-18 through 208-20 of PIU module 204-20, other than the ith PIU port 208-17 of PIU module 204-20, to the PIU modules 204-19, 204-21 and 204-22, other than the ith PIU port 208-13 of PIU module 204-19, and the jth PIU port 208-22 of PIU module 204-21. PIU blade controller 1514-1 may use the PIU port status map to determine which associated non-failing PIU ports 208-13 through 208-16 of PIU module 204-19 and non-failing PIU ports 208-17 through 208-20 of PIU module 204-20 may be used for transmission of their respective ODU traffic and which failing PIU ports 208-21 through 208-24 of PIU module 204-21 and failing PIU ports 208-25 through 208-28 of PIU module 204-22 should not be transmitted the respective ODU traffic. PIU blade controller 1514-1 may also transmit a fourth MAC broadcast failure message associated with the fault condition 1522-2, the second fault condition 1522-3, and the third fault condition 1522-4 immediately to report the fault condition 1522-2, the second fault condition 1522-3, and the third fault condition 1522-4 to PIU blade controller 1514-2 associated with PIU modules 204-21 and 204-22. PIU blade controller 1514-1 may further transmit its PIU port status map associated with the fault condition 1522-2, the second fault condition 1522-3, and the third fault condition 1522-4 to OTN switch controller 214.

In the case that PIU blade controller 1514-1 has received failure messages from other PIU blade controllers 1514, e.g. PIU blade controller 1514-2, prior to the expiration of the delay, it may indicate that Ethernet fabric plane 1520-1 has failed. After expiration of the delay, PIU blade controller 1514-1 may start the second delay and a third delay associated with PIU module 204-19 and PIU module 204-20. In an embodiment, the third delay may be set to a random between N/2 and M. The second delay, the number N, and the number M are as previously described.

After expiration of the second delay, PIU blade controller 1514-1 may transmit a fifth MAC broadcast failure message associated with the PIU port status map that indicates which PIU ports 208 on the M Ethernet fabric planes 1520 have failed. The current PIU port status map indicates that the ith PIU port 208-13 of corresponding PIU module 204-19 on the ith Ethernet fabric plane 1520-1 and the ith PIU port 208-17 of corresponding PIU module 204-20 on the ith Ethernet fabric plane 1520-1 have failed. PIU blade controller 1514-1 may continue to update the PIU port status map from any failure messages received from PIU blade controller 1514-2. After expiration of the third delay, PIU blade controller 1514-1 may start transmission of the respective ODU traffic from the M PIU ports 208-14 through 208-16 of PIU module 204-19, other than the ith PIU port 208-13 of PIU module 204-19, to the PIU modules 204-20, 204-21 and 204-22, other than the ith PIU port 208-17 of PIU module 204-20. PIU blade controller 1514-1 may also start transmission of the respective ODU traffic from the M PIU ports 208-18 through 208-20 of PIU module 204-20, other than the ith PIU port 208-17 of PIU module 204-20, to the PIU modules 204-19, 204-21 and 204-22, other than the ith PIU port 208-13 of PIU module 204-19. PIU blade controller 1514-1 may further transmit its PIU port status map to OTN switch controller 214.

In one or more other embodiments, during operation of OTN switching system 1500, PIU modules 204-21 and 204-22 associated with PIU blade controller 1514-2 may not have detected any fault conditions 1522 associated with their own PIU ports 208-21 through 208-28 corresponding to respective PIU modules 204-21 and 204-22. Upon PIU blade controller 1514-2 receiving a sixth MAC broadcast failure message associated with fault condition 1522-2 associated with PIU port 208-13 of corresponding PIU module 204-19 on the ith Ethernet fabric plane 1520-1, PIU blade controller 1514-2 may stop transmission of its respective ODU traffic via all its PIU ports 208-21 of PIU module 204-21 and 208-25 of PIU module 204-22 on the ith Ethernet fabric plane 1520-1. PIU blade controller 1514-2 may also start an associated fourth delay. In an embodiment, the fourth delay may be set to (3×N+M), where N and M are as previously described. The delay, the second delay, the third delay, and the fourth delay may each be implemented using a timer, a delay device, or another mechanism. The expiration of the third delay is after the expiration of the second delay, and the expiration of the second delay is after the expiration of the delay. PIU blade controller 1514-2 may also create a second PIU port status map that indicates PIU port 208-13 of corresponding PIU module 204-19 on the ith Ethernet fabric plane 1520-1 have failed. PIU blade controller 1514-2 may further update the second PIU port status map based on any further MAC broadcast failure messages it receives or fault conditions detected by PIU modules 204-21 and 204-22.

After expiration of the fourth delay, PIU blade controller 1514-2 may start transmission of the respective ODU traffic from the M PIU ports 208-21 through 208-24 of PIU module 204-21 to the PIU modules 204-19, 204-20 and 204-22, other than the ith PIU port 208-13 of PIU module 204-19. PIU blade controller 1514-2 may also start transmission of the respective ODU traffic from the M PIU ports 208-25 through 208-28 of PIU module 204-22 to the PIU modules 204-19, 204-20 and 204-21, other than the ith PIU port 208-13 of PIU module 204-19. PIU blade controller 1514-2 may further transmit a seventh MAC broadcast failure message associated with the second PIU port status map that indicates which PIU ports 208 on the M Ethernet fabric planes 1520 have failed to the PIU ports 208 of PIU modules 208 on the corresponding Ethernet fabric planes 1520 that have not failed. The current second PIU port status map indicates that the ith PIU port 208-13 of corresponding PIU module 204-19 on the ith Ethernet fabric plane 1520-1 has failed. PIU blade controller 1514-2 may further transmit its second PIU port status map to OTN switch controller 214.

In one or more other embodiments, during operation of OTN switching system 1500, PIU modules 204-21 associated with PIU blade controller 1514-2 may have detected the fault condition 1522-4 associated with its own PIU port 208-21. In this case, PIU blade controller 1514-2 performs the same Ethernet fabric protection as the case in which PIU modules 204-21 and 204-22 associated with PIU blade controller 1514-2 may not have detected any fault conditions 1522 associated with their own PIU ports 208-21 through 208-28 corresponding to respective PIU modules 204-21 and 204-22.

OTN switch controller 214 may synthesize all the failure conditions from all the PIU port status maps and failure messages it has received and analyze all of the synthesized failures to determine if any discrepancies exist. When the determination indicates that a discrepancy exists, OTN switch controller 214 may raise an alarm and push a worst case PIU port status map to all the PIU blade controllers 1514 in OTN switching system 1500. When the determination indicates that a discrepancy does not exist, OTN switch controller 214 may record all of the synthesized failure conditions and perform management tasks related to all of the synthesized failures for OTN switching system 1500.

By having the PIU blade controllers 1514 of OTN switching system 1500 perform Ethernet fabric protection in this distributed manner, the efficiency of determining how many PIU ports 208 of corresponding PIU modules 204 have failed and how many have not failed may be improved. Performing Ethernet fabric protection in this distributed manner, may also allow the PIU blade controllers on the same Ethernet fabric plane 1520 to be made aware of the PIU port failures in real-time. Performing Ethernet fabric protection in this distributed manner, may also allow the non-failing PIU ports 208 on the same Ethernet fabric plane 1520 to be used so that all of the Ethernet fabric planes 1520 may continue to benefit from load sharing while corrective action to repair or replace the failing Ethernet fabric planes or PIU port failures.

Figure 16:
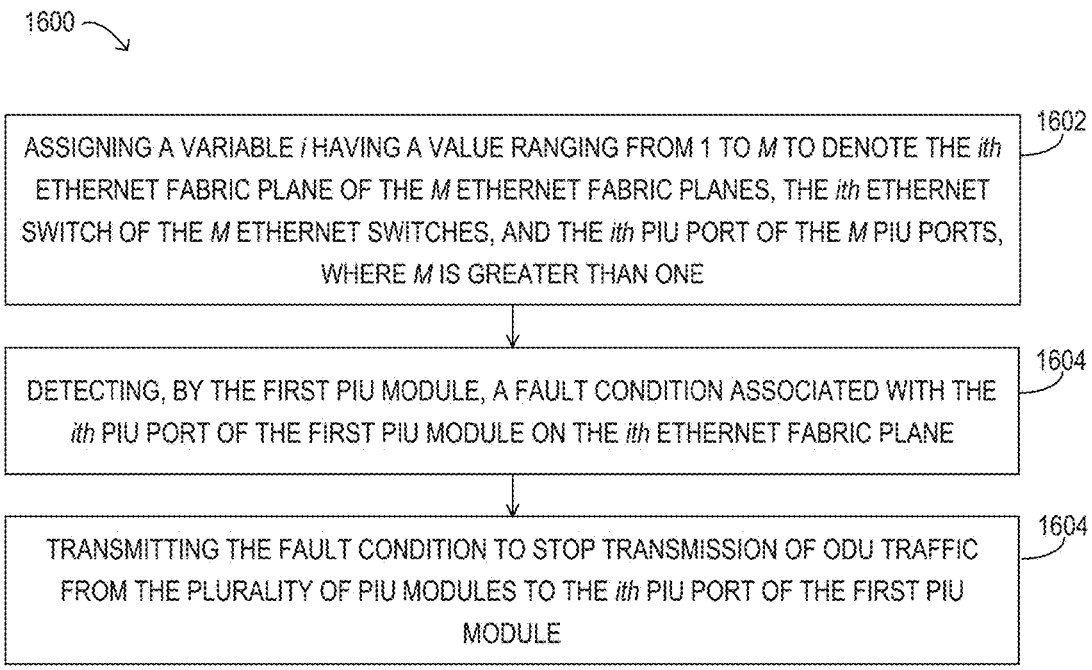
FIG. 16 is a flowchart of selected elements of an embodiment of a method for Ethernet fabric protection in an OTN switching system.

Referring now to FIG. 16, a flowchart of selected elements of an embodiment of a method 1600 for Ethernet fabric protection in an OTN switching system, as described herein, is depicted. In various embodiments, method 1600 may be performed using OTN switching systems 200, 1200, 1300, 1400, and 1500. It is noted that certain operations described in method 1600 may be optional or may be rearranged in different embodiments.

The OTN switching system of method 1600 may include an OTN switch. The OTN switch may include an Ethernet fabric having a number M of Ethernet fabric planes, each of the M Ethernet fabric planes may include a corresponding Ethernet switch of M Ethernet switches. The OTN switch may also include a plurality of PIU modules each having M PIU ports including a first PIU module, where an ith PIU port of each of the plurality of PIU modules may be connected to the ith Ethernet switch of the ith Ethernet fabric plane of the Ethernet fabric. Method 1600 may begin at step 1602, assigning a variable i having a value ranging from 1 to M to denote the ith Ethernet fabric plane of the M Ethernet fabric planes, the ith Ethernet switch of the M Ethernet switches, and the ith PIU port of the M PIU ports, where M is greater than one. At step 1604, detecting, by the first PIU module, a fault condition associated with the ith PIU port of the first PIU module on the ith Ethernet fabric plane. At step 1606, transmitting the fault condition to stop transmission of ODU traffic from the plurality of PIU modules to the ith PIU port of the first PIU module.

As disclosed herein, methods and systems for Ethernet fabric protection in a disaggregated OTN switching system that include PIU modules each having multiple ports for OTN to Ethernet transceiving and an Ethernet fabric as a switching core are disclosed. An OTN over Ethernet module in each of the PIU modules may enable various OTN functionality to be realized using the Ethernet fabric which may include multiple Ethernet switches. A first PIU module may detect a fault condition on an Ethernet fabric plane of the Ethernet fabric. In response to the detection, the OTN switching system may transmit the fault condition to other PIU modules to redirect ODU traffic away from the fault on the Ethernet fabric plane.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for Ethernet fabric protection,
in an optical transport network (OTN) switch comprising:
an Ethernet fabric having a number M of Ethernet fabric planes, each of the M Ethernet fabric planes includes a corresponding Ethernet switch of M Ethernet switches; and
a plurality of plug-in universal (PIU) modules each having M PIU ports including a first PIU module, wherein an ith PIU port of each of the plurality of PIU modules is connected to the ith Ethernet switch of the ith Ethernet fabric plane of the Ethernet fabric, the method comprising:
assigning a variable i having a value ranging from 1 to M to denote the ith Ethernet fabric plane of the M Ethernet fabric planes, the ith Ethernet switch of the M Ethernet switches, and the ith PIU port of the M PIU ports, wherein M is greater than one;
detecting, by the first PIU module, a fault condition associated with the ith PIU port of the first PIU module on the ith Ethernet fabric plane; and
transmitting the fault condition to stop transmission of optical data unit (ODU) traffic from the plurality of PIU modules to the ith PIU port of the first PIU module.

2. The method of claim 1, further comprising:
after transmitting the fault condition to stop transmission of the ODU traffic from the plurality of PIU modules to the ith PIU port of the first PIU module,
stopping the transmission of the ODU traffic from the plurality of PIU modules to the ith PIU port of the first PIU module.

3. The method of claim 1, further comprising:
detecting, by a second PIU module of the plurality of PIU modules, a second fault condition associated with the ith PIU port of the second PIU module on the ith Ethernet fabric plane; and
transmitting the second fault condition to stop the transmission of the ODU traffic from the plurality of PIU modules to the ith PIU port of the second PIU module.

4. The method of claim 3, wherein transmitting the fault condition and transmitting the second fault condition are transmitted in the same transmission.

5. The method of claim 1, further comprising:
after receiving the fault condition and a second fault condition associated with the ith PIU port of a second PIU module of the plurality of PIU modules on the ith Ethernet fabric plane to stop the transmission of the ODU traffic from the plurality of PIU modules to the ith PIU port of the second PIU module,
stopping the transmission of the ODU traffic from the plurality of PIU modules to the ith PIU port of the first PIU module and the ith PIU port of the second PIU module.

6. The method of claim 1, further comprising:
prior to
transmitting the fault condition to stop the transmission of the ODU traffic from the plurality of PIU modules to the ith PIU port of the first PIU module and
transmitting a second fault condition associated with the ith PIU port of a second PIU module of the plurality of PIU modules on the ith Ethernet fabric plane to stop the transmission of the ODU traffic from the plurality of PIU modules to the ith PIU port of the second PIU module,
stopping the transmission of the ODU traffic from the M PIU ports of the first PIU module and the M PIU ports of the second PIU module; and
after expiration of a delay associated with the first PIU module and the second PIU module,
transmitting the second fault condition to stop the transmission of the ODU traffic from the plurality of PIU modules to the ith PIU port of the second PIU module.

7. The method of claim 6, further comprising:
after expiration of a second delay associated with the first PIU module and the second PIU module,
transmitting the ODU traffic from the M PIU ports of the first PIU module other than the ith PIU port of the first PIU module and
transmitting the ODU traffic from the M PIU ports of the second PIU module other than the ith PIU port of the second PIU module, wherein the expiration of the second delay is after the expiration of the delay.

8. The method of claim 6, further comprising:
receiving a third fault condition associated with the jth PIU port of a third PIU module on the ith Ethernet fabric plane to stop the transmission of the ODU traffic from the plurality of PIU modules to the jth PIU port of the third PIU module; and
after expiration of a second delay associated with the first PIU module and the second PIU module,
transmitting the ODU traffic from the M PIU ports of the first PIU module, other than the ith PIU port of the first PIU module, and the M PIU ports of the second PIU module, other than the ith PIU port of the second PIU module, to the plurality of PIU modules other than the ith PIU port of the first PIU module, the ith PIU port of the second PIU module, and the jth PIU port of the third PIU module, wherein the expiration of the second delay is after the expiration of the delay.

9. The method of claim 1, further comprising:
prior to
transmitting the fault condition to stop the transmission of the ODU traffic from the plurality of PIU modules to the ith PIU port of the first PIU module and
transmitting a second fault condition associated with the ith PIU port of a second PIU module of the plurality of PIU modules on the ith Ethernet fabric plane to stop the transmission of the ODU traffic from the plurality of PIU modules to the ith PIU port of the second PIU module,
stopping the transmission of the ODU traffic from the M PIU ports of the first PIU module and the M PIU ports of the second PIU module;
receiving a third fault condition associated with the jth PIU port of a third PIU module on the ith Ethernet fabric plane to stop the transmission of the ODU traffic from the plurality of PIU modules to the jth PIU port of the third PIU module;
after expiration of a second delay associated with the first PIU module and the second PIU module,
transmitting the second fault condition to stop the transmission of the ODU traffic from the plurality of PIU modules to the ith PIU port of the second PIU module; and
transmitting the third fault condition to stop the transmission of the ODU traffic from the plurality of PIU modules to the jth PIU port of the third PIU module.

10. The method of claim 9, further comprising:
after expiration of a third delay associated with the first PIU module and the second PIU module,
transmitting the ODU traffic from the M PIU ports of the first PIU module, other than the ith PIU port of the first PIU module, and the M PIU ports of the second PIU module, other than the ith PIU port of the second PIU module, to the plurality of PIU modules other than the ith PIU port of the first PIU module, the ith PIU port of the second PIU module, and the jth PIU port of the third PIU module, wherein the expiration of the third delay is after the expiration of the second delay.

11. The method of claim 1, further comprising:
after receiving the fault condition and a second fault condition associated with the ith PIU port of a second PIU module of the plurality of PIU modules on the ith Ethernet fabric plane to stop the transmission of the ODU traffic from the plurality of PIU modules to the ith PIU port of the second PIU module,
stopping the transmission of the ODU traffic from the M PIU ports of a third PIU module of the plurality of PIU modules; and
after expiration of a delay associated with the third PIU module,
transmitting the ODU traffic from the M PIU ports of the third PIU module to the plurality of PIU modules other than the ith PIU port of the first PIU module and the ith PIU port of the second PIU module.

12. The method of claim 1, further comprising:
detecting a second fault condition of the ith Ethernet fabric plane; and
transmitting the ODU traffic from the plurality of PIU modules to the other Ethernet fabric planes.

13. An OTN switch comprising:
an Ethernet fabric having a number M of Ethernet fabric planes, each of the M Ethernet fabric planes includes a corresponding Ethernet switch of M Ethernet switches;
a plurality of PIU modules each having M PIU ports including a first PIU module, wherein an ith PIU port of each of the plurality of PIU modules is connected to the ith Ethernet switch of the ith Ethernet fabric plane of the Ethernet fabric, and wherein a variable i having a value ranging from 1 to M to denote the ith Ethernet fabric plane of the M Ethernet fabric planes, the ith Ethernet switch of the M Ethernet switches, and the ith PIU port of the M PIU ports, wherein M is greater than one,
the first PIU module to detect a fault condition associated with the ith PIU port of the first PIU module on the ith Ethernet fabric plane; and
the OTN switch to transmit the fault condition to stop transmission of ODU traffic from the plurality of PIU modules to the ith PIU port of the first PIU module.

14. The OTN switch of claim 13, further comprising:
a second PIU module of the plurality of PIU modules to detect a second fault condition associated with the ith PIU port of the second PIU module on the ith Ethernet fabric plane; and the OTN switch to transmit the second fault condition to stop the transmission of the ODU traffic from the plurality of PIU modules to the ith PIU port of the second PIU module.

15. The OTN switch of claim 13, further comprising:
the OTN switch, after receiving the fault condition and a second fault condition associated with the ith PIU port of a second PIU module of the plurality of PIU modules on the ith Ethernet fabric plane, to:
stop the transmission of the ODU traffic from the plurality of PIU modules to the ith PIU port of the second PIU module; and
stop the transmission of the ODU traffic from the plurality of PIU modules to the ith PIU port of the first PIU module and the ith PIU port of the second PIU module.

16. The OTN switch of claim 13, further comprising:
the OTN switch, prior to
the transmission of the fault condition to stop the transmission of the ODU traffic from the plurality of PIU modules to the ith PIU port of the first PIU module and
the transmission of a second fault condition associated with the ith PIU port of a second PIU module of the plurality of PIU modules on the ith Ethernet fabric plane to stop the transmission of the ODU traffic from the plurality of PIU modules to the ith PIU port of the second PIU module, to
stop the transmission of the ODU traffic from the M PIU ports of the first PIU module and the M PIU ports of the second PIU module; and
the OTN switch, after expiration of a delay associated with the first PIU module and the second PIU module, to
transmit the second fault condition to stop the transmission of the ODU traffic from the plurality of PIU modules to the ith PIU port of the second PIU module.

17. The OTN switch of claim 16, further comprising:
the OTN switch, after expiration of a second delay associated with the first PIU module and the second PIU module, to:
transmit the ODU traffic from the M PIU ports of the first PIU module other than the ith PIU port of the first PIU module; and
transmit the ODU traffic from the M PIU ports of the second PIU module other than the ith PIU port of the second PIU module, wherein the expiration of the second delay is after the expiration of the delay.

18. The OTN switch of claim 13, further comprising:
a third PIU module of the plurality of PIU modules;
the OTN switch, prior to
the transmission of the fault condition to stop the transmission of the ODU traffic from the plurality of PIU modules to the ith PIU port of the first PIU module and
the transmission of a second fault condition associated with the ith PIU port of a second PIU module of the plurality of PIU modules on the ith Ethernet fabric plane to stop the transmission of the ODU traffic from the plurality of PIU modules to the ith PIU port of the second PIU module, to:
stop the transmission of the ODU traffic from the M PIU ports of the first PIU module and the M PIU ports of the second PIU module; and
receive a third fault condition associated with the jth PIU port of the third PIU module on the ith Ethernet fabric plane to stop the transmission of the ODU traffic from the plurality of PIU modules to the jth PIU port of the third PIU module; and
the OTN switch, after expiration of a second delay associated with the first PIU module and the second PIU module, to:
transmit the second fault condition to stop the transmission of the ODU traffic from the plurality of PIU modules to the ith PIU port of the second PIU module; and
transmit the third fault condition to stop the transmission of the ODU traffic from the plurality of PIU modules to the jth PIU port of the third PIU module.

19. The OTN switch of claim 18, further comprising:
the OTN switch, after expiration of a third delay associated with the first PIU module and the second PIU module, to
transmit the ODU traffic from the M PIU ports of the first PIU module, other than the ith PIU port of the first PIU module, and the M PIU ports of the second PIU module, other than the ith PIU port of the second PIU module, to the plurality of PIU modules other than the ith PIU port of the first PIU module, the ith PIU port of the second PIU module, and the jth PIU port of the third PIU module, wherein the expiration of the third delay is after the expiration of the second delay.

20. The OTN switch of claim 13, further comprising:
a second PIU module of the plurality of PIU modules;
a third PIU module of the plurality of PIU modules, after receiving the fault condition and a second fault condition associated with the ith PIU port of the second PIU module on the ith Ethernet fabric plane to stop the transmission of the ODU traffic from the plurality of PIU modules to the ith PIU port of the second PIU module, to
stop the transmission of the ODU traffic from the M PIU ports of the third PIU module; and
the third PIU module, after expiration of a delay associated with the third PIU module, to
transmit the ODU traffic from the M PIU ports of the third PIU module to the plurality of PIU modules other than the ith PIU port of the first PIU module and the ith PIU port of the second PIU module.

* * * * *